United States Patent [19]

Endo et al.

[11] Patent Number: 5,491,590
[45] Date of Patent: Feb. 13, 1996

[54] ROTARY HEAD RECORDING AND PLAYBACK APPARATUS AND METHOD

[75] Inventors: Kazuhito Endo; Masayuki Ishida, both of Nagaokakyo, Japan

[73] Assignee: Mitsubishi Denki Kabushiki Kaisha, Tokyo, Japan

[21] Appl. No.: 31,482

[22] Filed: Mar. 15, 1993

Related U.S. Application Data

[63] Continuation of Ser. No. 520,741, May 9, 1990, abandoned.

[30] Foreign Application Priority Data

| May 12, 1989 | [JP] | Japan | 1-119207 |
| May 12, 1989 | [JP] | Japan | 1-119208 |
| May 12, 1989 | [JP] | Japan | 1-119209 |
| Oct. 20, 1989 | [JP] | Japan | 1-274353 |
| Dec. 26, 1989 | [JP] | Japan | 1-341436 |

[51] Int. Cl.$^6$ .............................. G11B 5/02; G11B 5/09
[52] U.S. Cl. .............................. 360/19.1; 360/48; 360/32
[58] Field of Search .............................. 360/19.1, 32, 48

[56] References Cited

U.S. PATENT DOCUMENTS

| 4,622,598 | 11/1986 | Doi et al. | 360/32 X |
| 4,672,467 | 6/1987 | Heitmann | 358/314 |
| 4,675,754 | 6/1987 | Endo et al. | 360/32 |
| 4,685,004 | 8/1987 | Takahashi et al. | 360/32 |
| 4,807,055 | 2/1989 | Tsunoda et al. | 360/32 |
| 5,113,293 | 5/1992 | Endo et al. | 360/32 |

FOREIGN PATENT DOCUMENTS

| 0155101 | 9/1985 | European Pat. Off. . |
| 0321217 | 12/1988 | European Pat. Off. . |
| 0335273 | 4/1989 | European Pat. Off. . |
| 0336424 | 4/1989 | European Pat. Off. . |
| 2220521 | 6/1989 | United Kingdom . |

OTHER PUBLICATIONS

Fernseh– und Kino–Technik, No. 1/2, Jan./Feb. 1987, J. Heitmann, "Der digitale Videorecorder Entwurf des elektrischen Teils des Standards".

"Wideband Recording Technology for High–Definition Baseband VCRs" in IEEE Transactions on Consumer Electronics, vol. CE–33, No. 3, Aug. 1987, pp. 203–209.

"The National Technical Report", vol. 32, No. 4 Aug. 1986, pp. 12–13.

*Primary Examiner*—Aristotelis Psitos
*Assistant Examiner*—Varsha A. Kapadia

[57] ABSTRACT

In a method of recording digital information signals to form tracks on a magnetic tape, the samples of the signals to be recorded are divided into a plurality of odd sample groups and a plurality of even samples groups. The groups containing adjacent samples are disposed on differently-numbered regions of different tracks. Error correcting codeword may be recorded in a plurality of tracks. Errors in one region can be corrected or compensated by samples in different tracks or samples in differently-numbered regions.

29 Claims, 28 Drawing Sheets

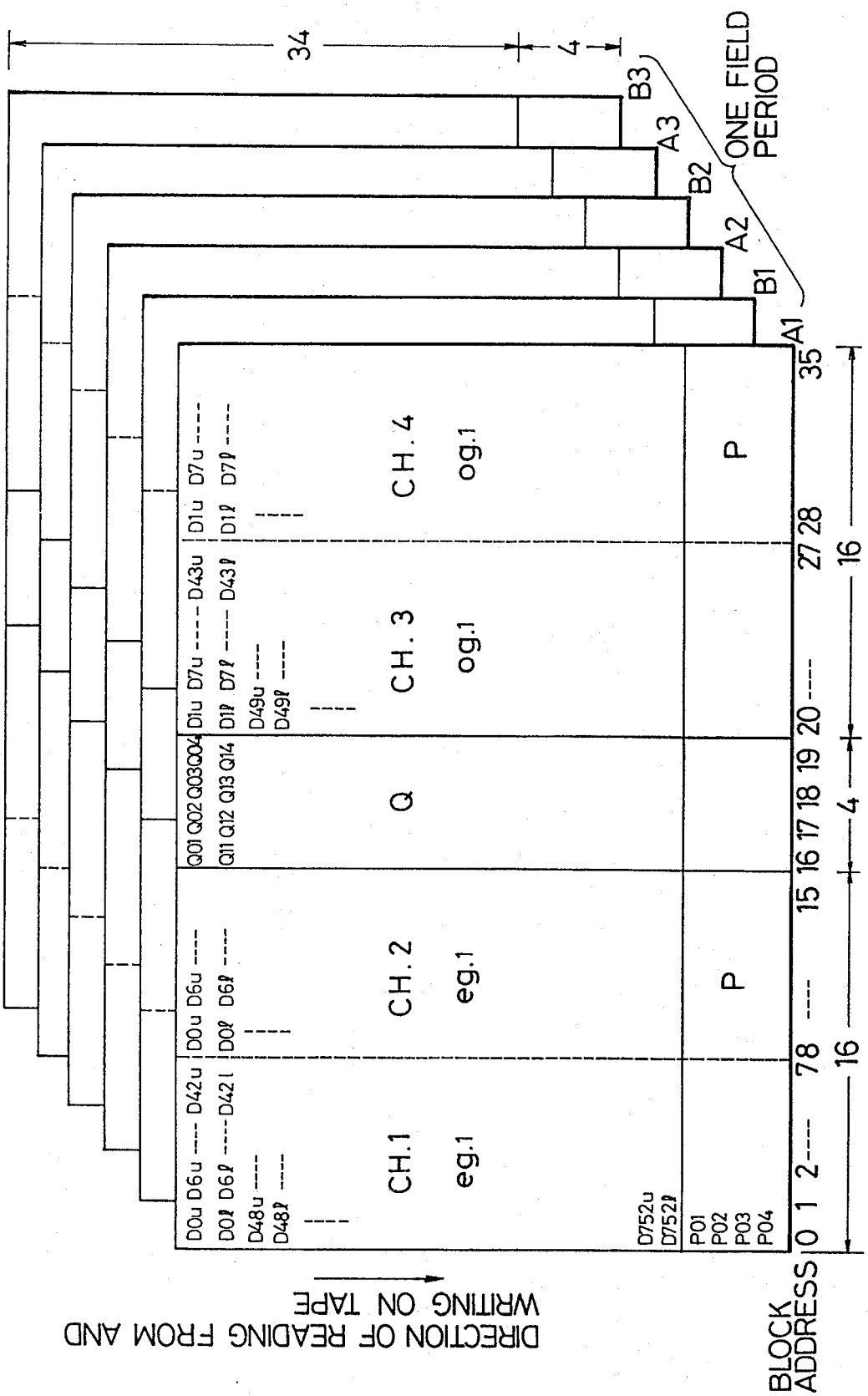

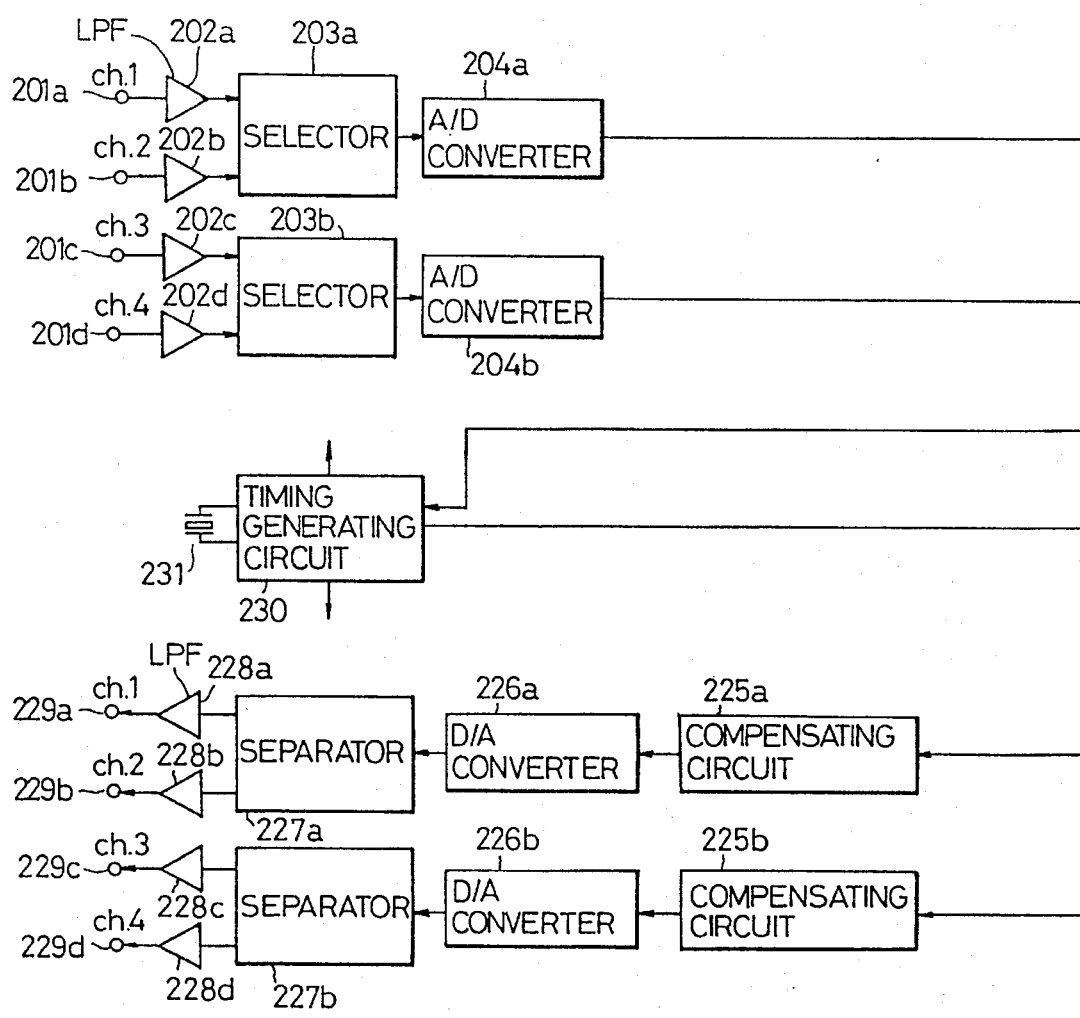

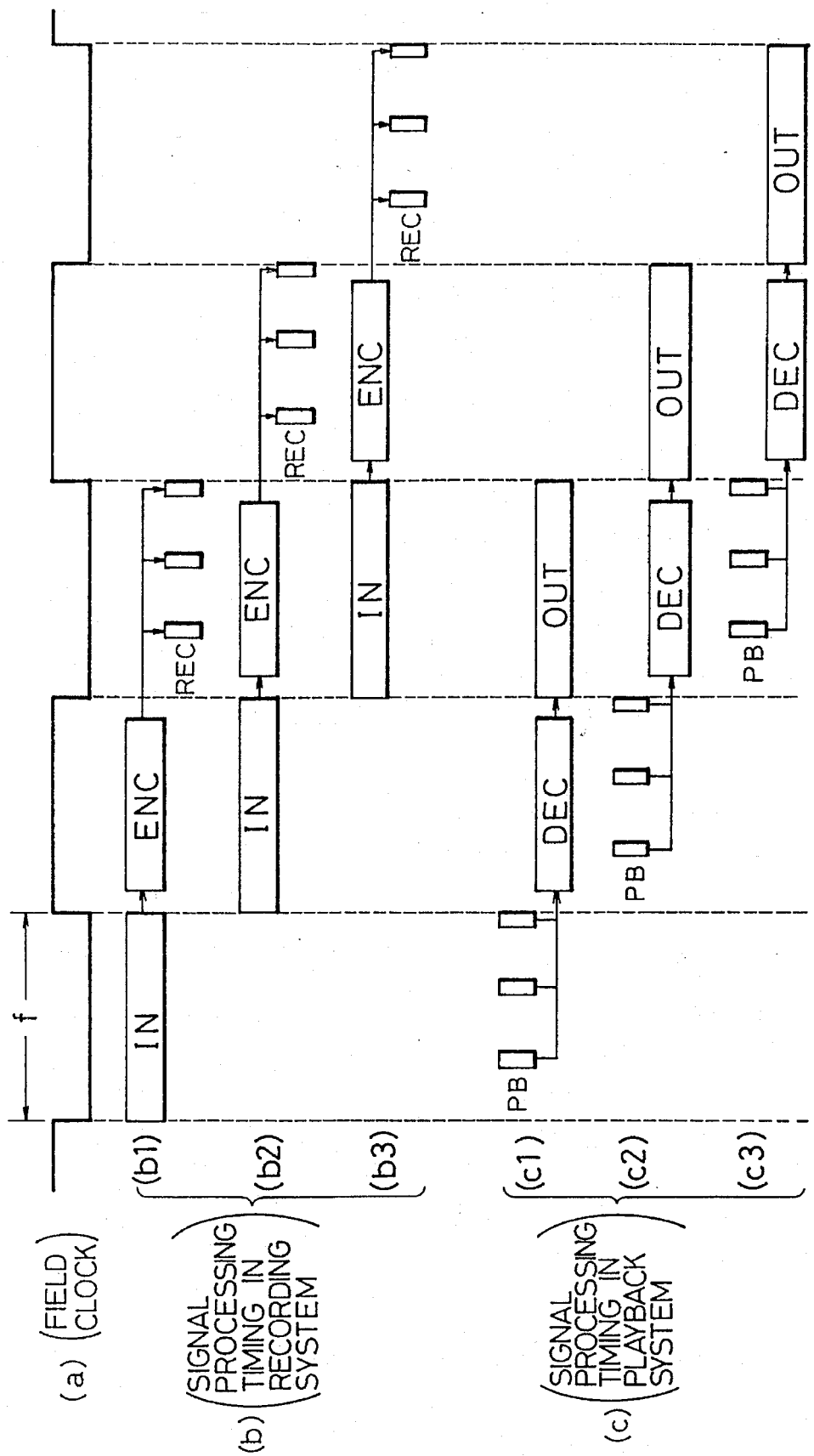

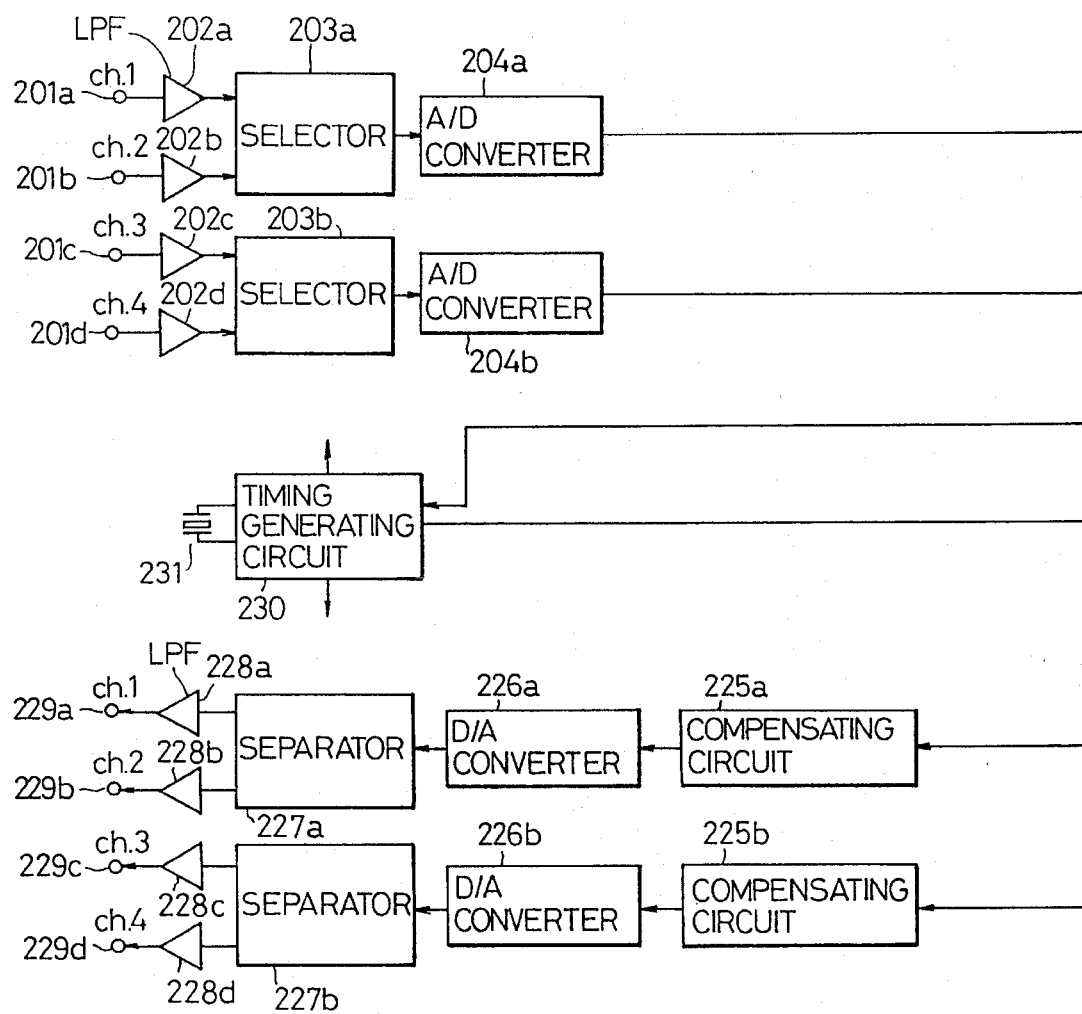

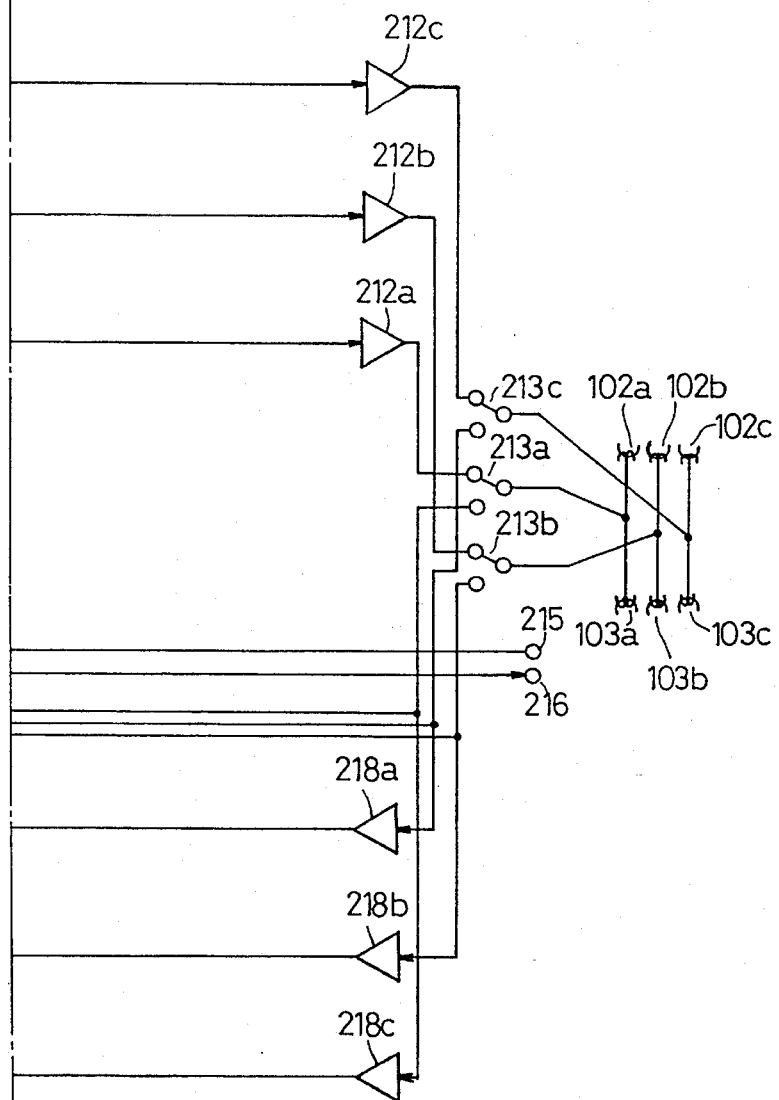

(ONE FIELD PERIOD)

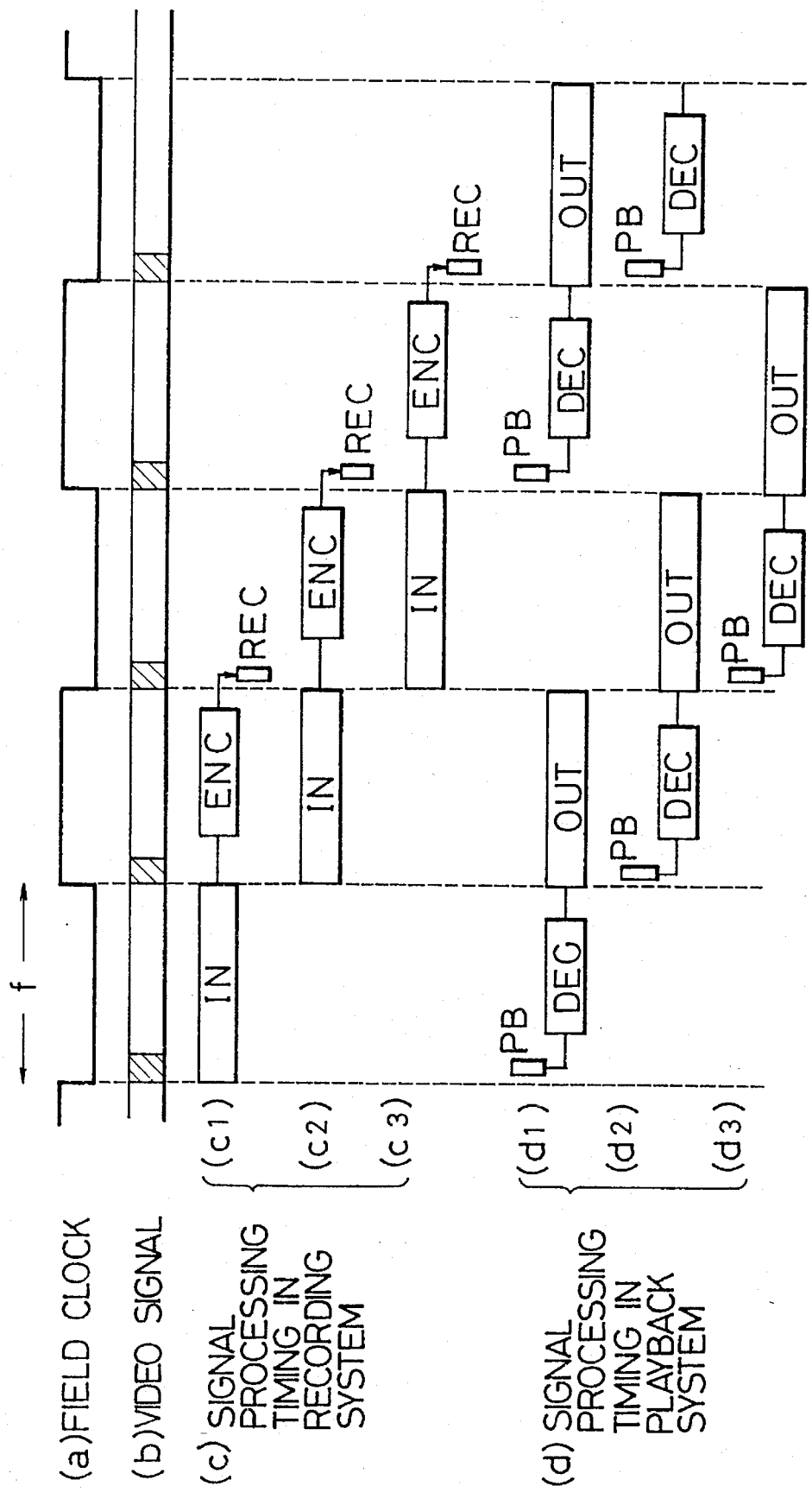

ROTARY HEAD RECORDING AND PLAYBACK APPARATUS AND METHOD

This application is a continuation of application Ser. No. 07/520,741 filed on May 9, 1990, now abandoned.

BACKGROUND OF THE INVENTION

The present invention relates to apparatus with a rotary head for recording and playing back digital audio signals or other digital information signals.

Video-tape recorders (VTRs) with a rotary head for recording high definition television signals (hereinafter referred to as HDTV signals), by forming helical tracks on a magnetic tape, and playing back the recorded signals have been developed.

For instance, an article "Wideband Recording Technology for High-definition Baseband VCRs," in IEEE Transactions on Consumer Electronics, Vol. CE-33, No. 3, August 1987 shows a VTR for recording HDTV signals in one field, being divided into 3 segments each consisting of 2 channels.

The drum and head configuration of this VTR is shown in FIG. 29, and its track pattern is shown in FIG. 30.

As illustrated, a magnetic tape 104 moving in the direction of an arrow 106 is passed around a rotary drum 101 rotating in the direction indicated by an arrow 105. A pair of heads 102a and 102b are disposed adjacent to each other and serve as channels A and B (hereinafter referred to as CH.A and CH.B), anti another pair of heads 103a and 103b adjacent to each other are disposed 180° spaced apart from the heads 102a and 102b to serve as a pair of channels. The magnetic heads mounted on the periphery of the rotary drum 101 scan the magnetic tape 104 in the direction indicated by an arrow 107 (FIG. 30). During recording, such scanning form tracks 108, each of which is formed by one scanning by a head for one channel. A video signal of one field is recorded over an area T which comprises several tracks.

A pair of tracks CH.A and CH.B formed by the pair of heads are called a segment. A video signal of one field is therefore recorded in three segments.

The VTR recording HDTV signals records signals of a frequency band wider than the conventional TV signals. The following methods are therefore employed.
(1) The HDTV video signals are divided into two channels in order to reduce the frequency band per channel.
(2) The rotational speed of the drum is increased to 90 rps (revolution per second) which is three times higher than in the conventional VTR to increase the relative speed between the tape and the head to accomplish a wide band FM (frequency-modulated) recording. As a result, the video signal in one field is recorded being divided into three segments.

Since the actual format of the video signal recorded is not relevant to the invention, its description is omitted.

As has been described, a scheme widely adopted in recording and playing back HDTV signals is to divide the video signal of one field or one frame into a plurality of segments each consisting of a plurality of channels.

When an audio signal corresponding to the HDTV signal is recorded, it is desirable to record and play back in digital form, employing PCM (pulse-coded modulation) for example, in order to achieve a high quality audio signal.

In the VTRs described above, when a digital audio signal is to be recorded in addition to the video, for the purpose of facilitating independent rewriting of the video and the audio (after-recording), it is contemplated to dispose a region for digital audio recording on the extension of the video tracks, as in an 8 mm VTR.

An attempt along this line is shown in the article "Wideband Compression Hi Vision VTR," National Technical Report, Vol. 32, No. 4, August, 1986.

FIG. 31 is a schematic diagram showing the track patterns recorded by such a device. As illustrated, a video signal of one field is divided into 2 channels, A and B, and recorded in a single segment. The signal area for the video signal on one track is denoted by 109. The audio signal of the two channels in the one field is recorded in the digital audio signal areas 110 formed in each track, being separated from the video signal areas by a gap or a predetermined length. The audio signal of one channel is recorded in association with the area for the video signal for one channel, CH.A, and the audio signal of the other channel is recorded in association with the area for the video signal of the other channel, CH.B.

In the conventional apparatus having rotary heads for recording and playing back the digital audio signals and the like, when one head is not functioning, the audio information of one channel of one field is entirely lost.

Another problem is that the recording system does not have sufficient error correcting or error compensating capability against burst errors due to an extended scratch on the tape.

SUMMARY OF THE INVENTION

An object of the present invention is to provide a rotary head digital signal recording and playback apparatus having a capability of correcting and compensating the loss of signals throughout one complete track or the burst errors due for example to an extended scratch on the tape.

In a rotary-head recording/playback apparatus according to the present invention, digital signals of a plurality of channels are recorded, being distributed in m×n tracks (m and n being an integer equal to or greater than 2), digital signals for each channel in a unit time are divided into m× n sample groups, i.e., (m×n×l)-th to {(m×n×l)+(m×n−1)}-th sample groups according to the order of input or sample, and disposed so that each track contains only one of the (m×n) sample groups and the sample groups containing adjacent samples of the same channel are disposed being spaced in the longitudinal direction of the tracks.

At least part of the error correcting codeword is formed to interleave a plurality of tracks of the m×n tracks (in other words, to extend across such a plurality of tracks), and the same error correcting codeword does not contain adjacent samples.

In a rotary-head recording/playback apparatus according to the present invention, digital audio signals of one field period or one frame period are recorded, being distributed across m channels×n segments, i.e., j (N×m) tracks, the digital audio signals of one field or one frame are divided into (2×j) sample groups so that the even-numbered samples and odd-numbered samples belong to different groups, and one even sample group and one odd sample group are selected out of the (2×j) sample groups so that the sample groups are divided into j groups, and the sample groups containing adjacent samples in the same channel are disposed in regions spaced apart from each other in the longitudinal direction of the tracks, and the error correcting codeword for the digital audio signals contained in each track are formed to be completed across a plurality of tracks and adjacent samples in the same channel are contained in different error-correcting codewords.

According to the present invention, any arbitrary sample data and sample data adjacent thereto are recorded on different tracks, being spaced apart from each other in the longitudinal direction of the tracks. As a result, even if the above mentioned arbitrary sample data are incorrect, the probability that the adjacent sample data are correct is high, and the incorrect sample data can be replaced by a mean valve of both of the adjacent sample data.

Moreover, the error correction is made using the error-correcting code that is recorded and distributed on different tracks. As a result, the error correcting capability against burst errors within a track can be improved. Where a burst error which is beyond the error correcting capability occurs, at least one of the adjacent data can be corrected without being affected by the burst error, and a correct sample is obtained, and also an adequate compensating capability is obtained.

BRIEF DESCRIPTION OF THE DRAWINGS

FIG. 4 shows the data arrangement and code structure of one field the PCM audio signal in a memory.

FIG. 7 is a diagram showing the timing of the recording and playback of a PCM audio signal according to this embodiment.

FIG. 19 is a diagram showing the timing of the operation of the memory in the embodiment of FIG. 18.

DETAILED DESCRIPTION OF THE PREFERRED EMBODIMENTS

A detailed description of the present invention will be given by taking, as an example, the recording and playback of a four-channel audio signal paired with a video signal comprising three segments per field, each segment consisting of two channels, thus having six tracks per field as in the prior art.

Figure 1:
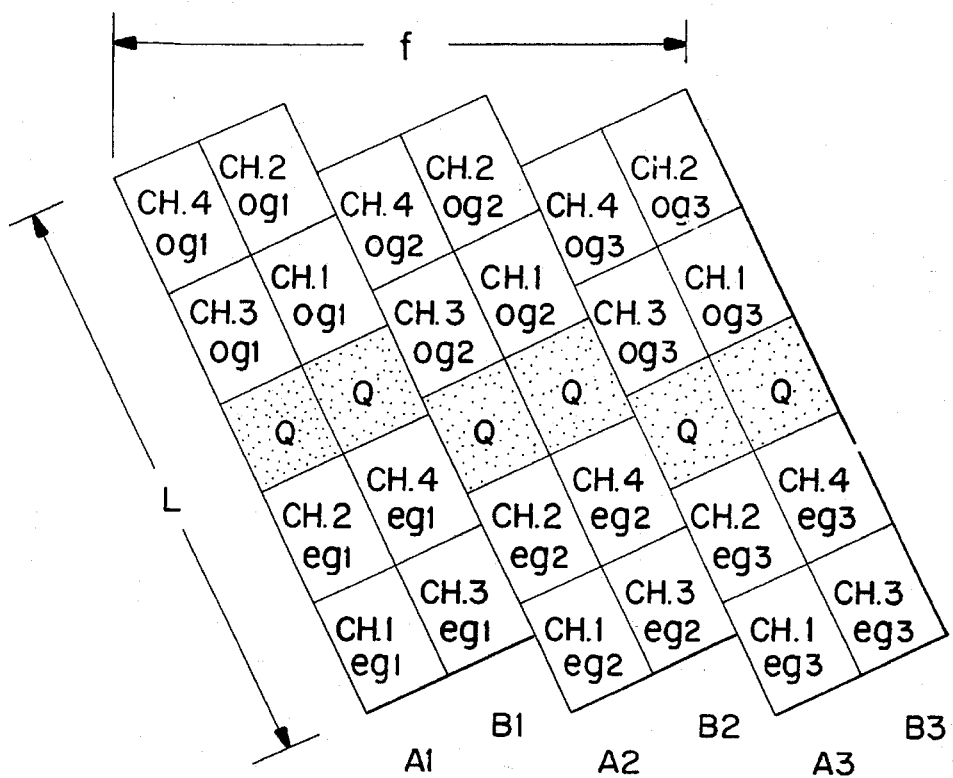
FIG. 1 is a track pattern diagram illustrating the interleaving pattern of PCM audio signal data samples according to an embodiment of the present invention.

FIG. 1 is a track pattern diagram illustrating the arrangement of PCM audio signal data according to an embodiment of the invention. The audio signal is interleaved across one video field.

Figure 2:
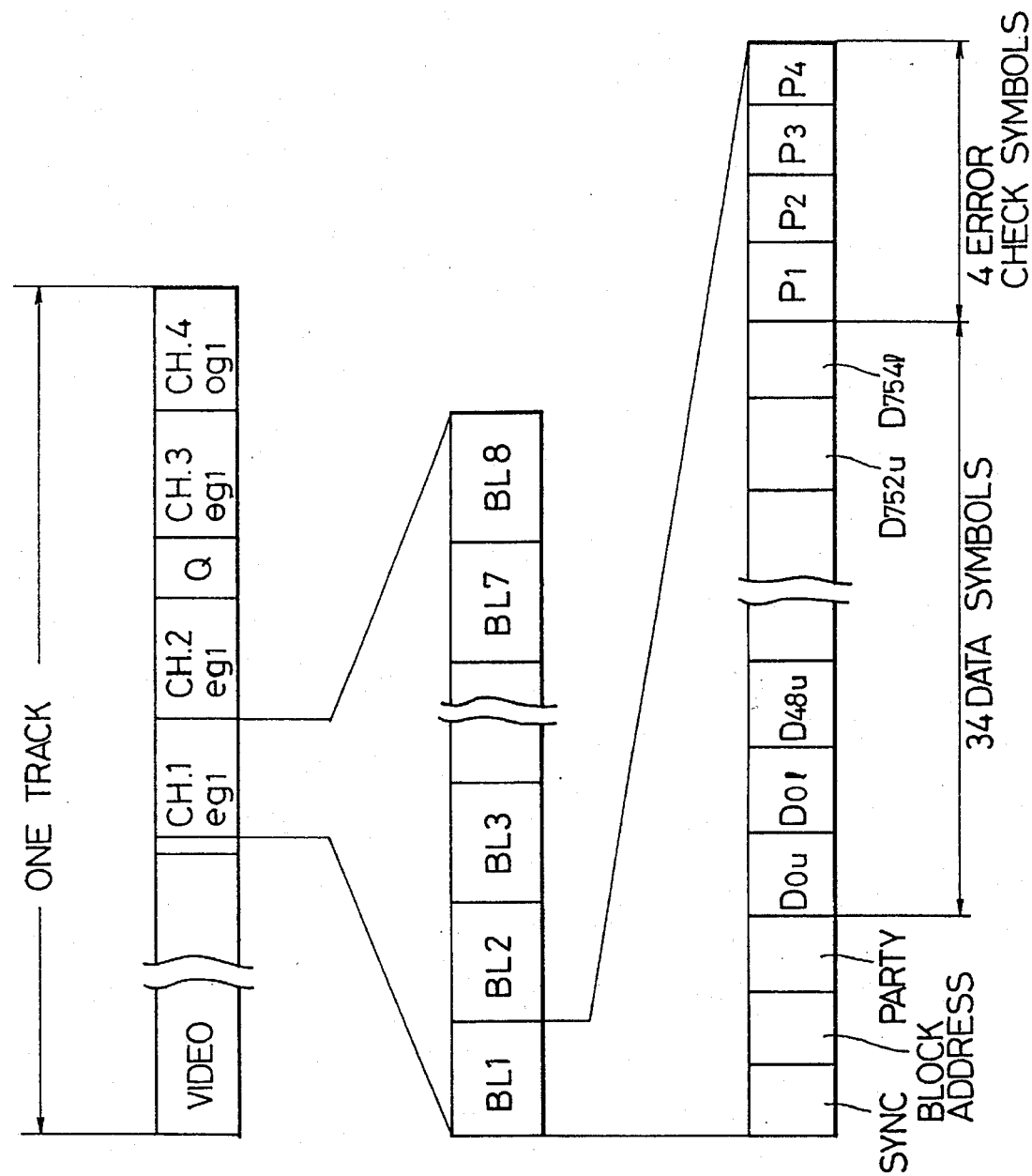
FIG. 2 is a schematic diagram showing the structure of one of the regions for recording audio signals.

FIG. 2 is a schematic diagram showing the structure of one of the regions for recording audio signals.

Figure 3:
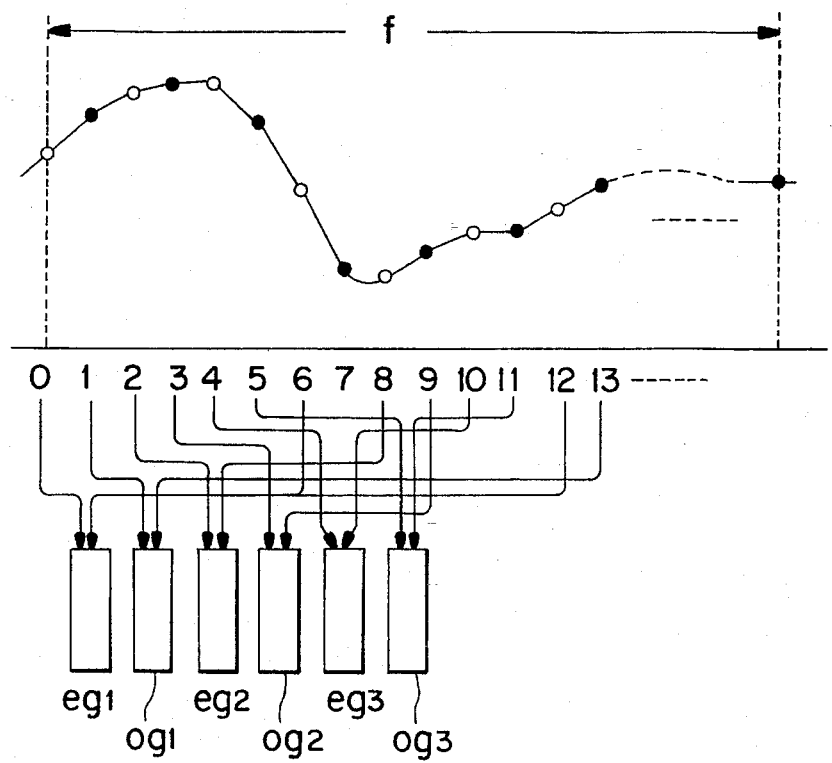
FIG. 3 is a schematic diagram illustrating the allocation of data within one audio channel, showing how a sequence of consecutive samples are assigned to regions in different tracks.

FIG. 3 is a schematic diagram illustrating the allocation of data within one audio channel, showing how a sequence of consecutive samples are assigned to regions in different tracks.

In this example audio information signals are recorded and played back in four channels: channel 1, channel 2, channel 3, and channel 4. The four-channel PCM signals which are inputted or sampled in one video field f is recorded and played back over six tracks (m=2, n=3).

With reference to FIG. 3, the samples for one channel of input in the field f are divided in cyclic order into six groups: three even groups (eg1, eg2, eg3) and three odd groups (og1, og2, og3). If the samples are numbered 0, 1 2, . . . , then sample 0 is placed in eg1, sample 1 in og1, sample 2 in eg2, sample 3 in og2, and so on, the groups thus comprising samples numbered as follows:

| | | |
|---|---|---|
| eg1 = => 6k | eg2 = => 6k + 2 | eg3 = => 6k + 4 |
| og1 = => 6k + 1 | og2 = => 6k + 3 | og3 = => 6k + 5 | where k is an integer equal to or greater than 0. The three even groups eg1 to eg3 comprise all the even-numbered samples in each field, and three odd groups og1 to og3 comprise all the odd-numbered samples. The areas marked Q in FIG. 1 contain check symbols (error cheek redundant symbols) for detecting and correcting errors in the PCM audio sample values. The check symbols (P) are also contained in the areas for the audio data symbols, marked CH.1eg1, CH.2eg1, etc. being distributed among the audio data symbols.

The interleaving rule in FIG. 1 is that a single track contains only one of the m×n sample groups for each audio channel, and adjacent sample groups in each channel are separated from each other in the longitudinal direction of the tracks, i.e., they are disposed in differently-numbered regions in different tracks. The rule ensures that, in each channel, samples that are consecutive or adjacent in time are disposed in different tracks in locations separated by at least one-half the audio track length (L) measured in the direction in which the tracks are scanned.

Thus, even if the head that scans one of the tracks becomes inoperable, or if a scratch parallel to the edges of the tape causes a burst error, the length of which is proportional to the width of the scratch measured in the direction perpendicular to the edges of the tape (more precisely, in the direction in which the tracks are scanned), there is a strong probability that each incorrect sample will be preceded and followed in time by a correct sample, so the incorrect sample can be replaced by, for example, interpolating the mean of the adjacent correct sample values.

The reason for locating the area marked Q, which contains part of the check symbols, in the middle is that adjacent samples will be separated by the additional length of the Q area, thus enhancing the interleaving effect of the present invention.

The interleaving in this embodiment and the error-correcting code, which is another feature of the present invention, will be explained with reference to FIG. 4, which shows the data structure of one field of the PCM audio signal, and FIG. 5, which schematically shows a codeword (error-correcting codeword) in the error-correcting code.

FIG. 4 shows the structure of error-correcting code comprising the PCM audio data symbols and check symbols for one field f as it would be stored in a signal memory device used in the recording and playback apparatus. The memory can be written and read eight bits (one byte) at a time. The sixteen-bit audio sample values are divided into eight upper bits and eight lower bits, each eight bits being stored in a one-byte slot. The eight-bit data in a slot is referred to as a symbol.

If the audio signal sampling rate is 48 kHz, the number of samples (Nsf) per channel in one field f, i.e., 1/60 sec., is:

$$N_{sf} = 48000/60 = 800 \text{ samples.}$$

To distribute these 800 samples×4 channels over six tracks, each track must have audio data slots for 800×4/6= 534 samples, comprising 1068 symbols. To simplify the data structure, each track is provided with slots for 1088 (=32× 34) audio data symbols, the unused slots being treated as dummy symbols.

The signal data structure in one plane in FIG. 4 corresponds to the PCM audio data symbols and check symbols for one track. The planes A1 to A3 and B1 to B3 correspond to the tracks A1 to A3 and B1 to B3 in FIG. 1. Each audio data symbol is denoted by the capital letter D followed by a suffix indicating its sample number and whether it is the upper (u) or lower (l) byte of the sample. Thus the 0-th sample in each channel comprises two symbols denoted D0u and D0l. Pxx denotes a check symbol (P symbol) belonging to a first or vertical error-correcting code. Qxx denotes a cheek symbol (Q symbol) belonging to a second or horizontal error-correcting code.

Each of the vertical error-correcting codewords in FIG. 4 consists of 38 symbols, comprising 34 audio data symbols or Q symbols and four P symbols. The 38 symbols in a vertical error-correcting codeword are treated as a data block. Blocks are read from memory and written on the tape in the order of the block addresses shown in FIG. 4, thus permuting or interleaving the data as illustrated in FIG. 1

FIG. 2 shows the arrangement of data on a track of the tape. As illustrated, each region, e.g., CH.1eg1 contains 8 blocks, each block contains 34 audio data symbols and 4 check symbols plus synchronous (sync.) code, block address signal, and a parity code for detecting errors in block address signal.

During recording, the sampled audio data for the four channels are written in the designated slots in the six-track memory area in a recording memory shown in FIG. 4, and are then recorded on the tape sequentially.

During playback, the audio data are sequentially read from the tape and stored in the designated slots in the six-track memory area in a playback memory and are then read from the specified slots and outputted in the original sample order.

A Reed-Solomon (RS) code on the Galois field $GF(2^8)$ is used for generating the cheek symbols P and Q. If h is the code length, k is the information length, and d is the minimum code distance, then:

P is an (h, k, d)= (38, 34, 5) RS code, and

Q is an (h, K, d)= (36, 32, 5) RS code.

The P and Q error-correcting codes comprise four symbols per codeword, enabling the correction of two incorrect symbols of arbitrary location in the error-correcting codeword (referred to as error correction), or up to four incorrect symbols if the locations of the incorrect symbols are known by other means (referred to as erasure correction).

The general procedure for correcting errors is first to use the P symbols to determine whether there is a symbol error in the vertical error-correcting code and store the result of the decoding of the vertical error-correcting code in a separate flag memory as flag information, then use the Q symbols to perform erasure correction, the positions of the errors being indicated by the flags.

The horizontal error-correcting codewords can be structured and the Q check symbols generated according to two methods.

One method is to proceed in the straight horizontal direction in FIG. 4, so that each error-correcting codeword is extend in one plane, that is, within one track. An advantage of this method is that an uncorrectable error in one track does not affect other tracks. A disadvantage is that burst errors continuing for more than four blocks per track cannot be corrected, but must be replaced by compensation, such as mean value interpolation. This method is accordingly unsuitable for systems prone to burst errors in the longitudinal direction of the tracks.

The second method is to interleave the error-correcting codewords across two or more segments (i.e., to make the error-correcting codeword to extend across two or more segments), thus enabling longer burst errors to be corrected. A disadvantage of this method is that if all the data in a certain track are incorrect, due to head clogging for example, the error will affect other tracks that are part of the same error-correcting code structure, thus increasing the amount of data that must be compensated. The error-correcting codes must therefore be structured so that it will not be necessary to compensate the values of adjacent samples.

Figure 5:
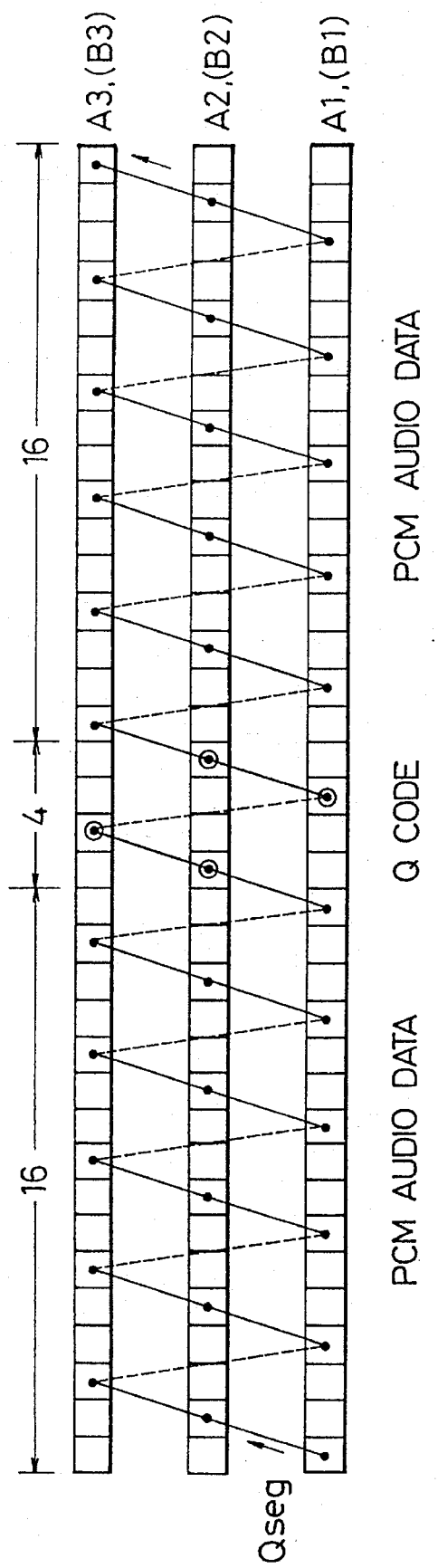
FIG. 5 is a schematic view of the A1, A2, and A3 planes in FIG. 4 as seen from above, looking parallel to the planes, showing an embodiment of the structure of a horizontal error-correcting codeword.

FIG. 5 is a schematic view of the A1, A2, and A3 planes (or B1, B2, and B3 planes) in FIG. 4 as seen from above, looking parallel to the planes, showing an embodiment of the structure of a horizontal error-correcting codeword. The error-correcting codeword comprises samples from three tracks, one track in each of the three segments making up the field. The arrow labeled Qseq in FIG. 5 indicates an error-correcting codeword starting in the plane A1 (or B1), comprising 36 symbols joined by solid and dashed lines, 32 of which are audio data symbols and four of which are Q check symbols.

By interleaving the error-correcting codewords over the full length of the field in this way, it is possible to correct a burst error of up to 12 blocks in one track. The burst error generates only four incorrect blocks per codeword, enabling erasure correction to be performed.

The codeword in FIG. 5 does not contain any pair of adjacent samples. If an uncorrectable burst error occurs, such as a burst error comprising 13 consecutive blocks in a track, even though all audio data symbols in the codeword are regarded as incorrect, their adjacent symbols are not affected because they are part of codewords disposed across different tracks, hence the correct adjacent values can be obtained for compensation. Thus adequate compensating capability is assured as well as adequate error-correcting capability.

FIG. 5 shows only the codeword beginning in the A1 (or B1) plane. Similar codewords are generated beginning in the A2 (or B2) and A3 (or B3) planes.

Next, an embodiment of a recording and playback apparatus for Implementing the above described interleaving of audio samples and code configuration will now be described.

Figure 6B:
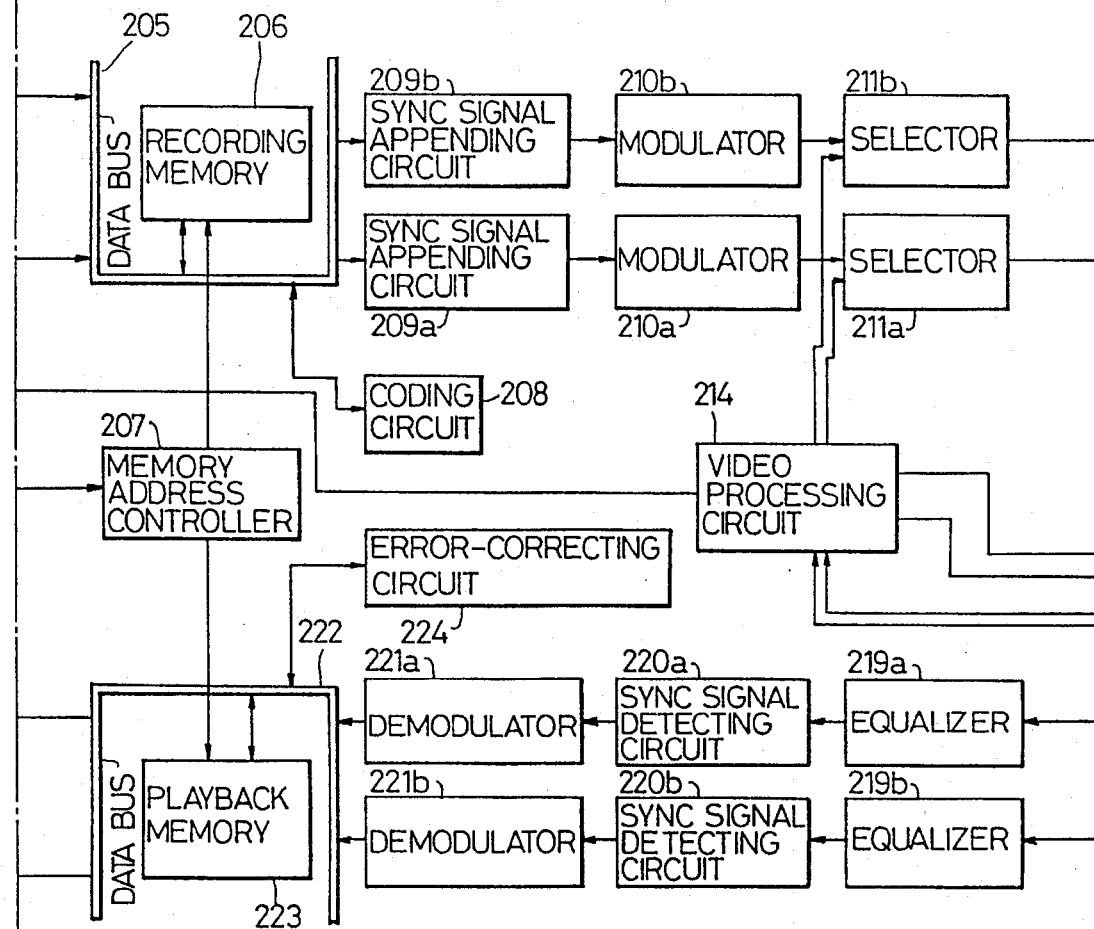
FIG. 6–6C is a block diagram showing the configuration of a VTR for an HDTV signal according to this embodiment.
Figure 6C:
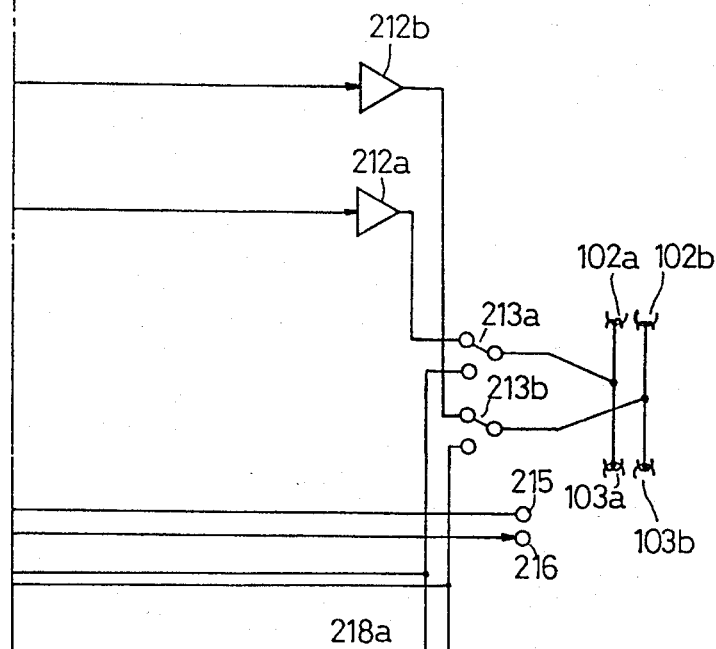

FIG. 6 is a block diagram showing the configuration of a VTR for an HDTV signal according to this embodiment. FIG. 7 is a diagram showing the timing of the recording and playback of a PCM audio signal according to this embodiment.

In FIG. 6, reference numerals 201a to 201d denote analog audio signal input terminals of the four channels, reference numerals 202a to 202d denote low-pass filters (LPFs) in the recording circuit of the four channels, and reference numerals 203a and 203b are selectors for selecting the audio signals, each provided for two channels, and outputting a signal of one circuit. Reference numerals 204a and 204b are analog-to-digital converters (A/D converters). Reference numerals 205 is a data bus for the memory for the recording circuit. Reference numeral 207 is a memory address controller. Reference numeral 208 is a coding circuit. Reference numeral 209a and 209b are a synchronous signal and block address signal appending circuit (hereinafter referred to as sync. signal appending circuit). Reference numerals 210a and 210b denote digital modulators, reference numerals 214 is an HDTV video signal processing circuit. Reference numeral 215 is a video signal input terminal. Reference numeral 216 is a video signal output terminal. Reference numerals 211a and 211b are selectors which make selection between the PCM audio recording signal and video recording signal. Reference numerals 212a and 212b are recording amplifiers. Reference numerals 213a and 213b denote recording/playback signal selecting switch. Reference numerals 218a and 218b are playback amplifiers. Reference numerals 219a and 219b denote playback equalizers. Reference numerals 220a and 220b denote synchronous signal detecting circuits. Reference numerals 221a and 221b denote demodulators. Reference numeral 222 is a memory data bus for the playback circuit. Reference numeral 224 denote an error detecting and correcting circuit (hereinafter referred to as correcting circuits). Reference numerals 225a and 225b denote compensating circuit. Reference numerals 226a and 226b denote digital-to-analog converters (D/A converters). Reference numerals 227a and 227b denote channel separators. Reference numerals 228a to 228b denote low-pass filters (LPFs) for the playback circuit. Reference numerals 229a to 229d denote analog output terminals of the four channels. Reference numeral 230 denotes a timing generating circuit for generating clock signals required by each circuit block. Reference numeral 231 denotes a quartz oscillator for generating a master clock signal.

The operation will now be described with regard to recording and then playback.

Audio signals of the four channel inputted through the analog audio signal input terminals passed through the LPFs 202a to 202d where their high frequency components are suppressed, and selected by the selectors 203a and 204b, and are then inputted into the A/D converters 204a and 204b.

In the illustrated embodiment, two A/D converters are provided because the A/D conversion is made after the selection. However, separate A/D converters may be provided for the respective channels.

At the A/D converter, the audio signal of each channel is converted into a digital signal of 16 bits. The digitized audio signal is then passed through the memory bus 205 of the recording circuit, and written in a recording memory 206. The recording memory 206 has three times the capacity for storing the audio data and error correcting codewords of the four channels for one field period. As shown in FIG. 7(b1), the audio data inputted during one field period (the period IN in the figure) is read during the next field period (the period ENC in the figure), and passed through the data bus 205 to the correcting circuit 208, where error correcting codes P and Q are generated, and the generated error correcting codes P and Q are passed through the data bus 205 and written in the recording memory 206.

The data written in the recording memory 206 are then divided into three segments, and read, with time-axis-compression, to be recorded in the above described audio regions. The recording on the tape is made segment by segment, i.e., with two adjacent heads forming, simultaneously two adjacent tracks. In association with the two heads, two sets of circuits including the sync. signal appending circuits 209a and 209b, and the circuits that follow them are provided. Data read from the recording memory 206, with time-axis-compression, are supplied to the sync. signal appending circuits 209a and 209b where a block sync. signal, a block address, and a parity code for error detection for the block address signal are appended to the header of each block. The data are then modulated at the modulators 210a and 210b. The modulation employed is an 8–14 modulation in which 8-bit data are modulated into 14-bit data. The video processing circuit 214 converts the HDTV video signal supplied to the video signal input terminal 215 into a recording signal in accordance with a predefined sequence. During playback, the reverse process is carried out to output the video signal at the video signal output terminal 216. But as these operations are not relevant to the gist of the present invention, so their description is omitted.

The selectors 211a and 211b select the video signal and the time-axis-compressed audio signal so that they will be recorded in the respective divided regions, and the selected signals are amplified at the recording amplifiers 212a and 212b, passed through the recording switches 213a and 213b, and supplied to two pairs of heads 102a and 102b and 103a and 103b by means of which the signals are recorded on the track pattern on the tape, shown in FIG. 1.

The operation of the playback system will now be described. Signals that are read by two pairs of heads 102a and 102b and 103a and 103b are passed through the switches 213a and 213b and amplified by the playback amplifiers 218a and 218b. The signals are then supplied to the equalizers 219a and 219b where their waveforms are equalized.

At the sync. detector 220a and 220b, the playback clock signal is extracted from playback digital signal by means of a PLL (phase locked loop), and the sync. signal added to each block is detected so that the position of the block is recognized. At the demodulators 221a and 221b, 14-8 demodulation is performed and the restored 8 bits data are written in the playback memory 223. As shown in FIG. 7(C), after writing of data that are recorded in 3 segments for one field, error correction is conducted during reproducing the period of the next field. The data in the memory are supplied through the data bus 222 to a correction circuit, 224, which use the error correcting codes P and Q to detect and correct errors that have occurred in the audio data, and the corrected values are then rewritten in the playback memory. Thus, correction is completed.

In the playback memory 223, juxtaposed to the area for storing the audio data and error correcting codewords is an area for storing flag information indicating the result of the error detection and the result of correction. In this area, flags corresponding to the audio data on which error has been detected but which could not been corrected.

The audio data of one field on which correction has been completed are then read from the playback memory 223, with time axis expansion during the next field period, and inputted to the compensating circuits 225a and 225b. Flags corresponding to the audio data 223 are also supplied to the compensating circuits 225a and 225b.

The compensating circuits 225a and 225b identify, by means of a flag, the audio data on which error has been detected but which has not been corrected, and perform the compensation process, and minimize the possibility of such erroneous audio signal being heard as an unpleasant sound. Generally, when consecutive samples are in error, the preceding value hold method in which the incorrect values are replaced by the immediately preceding correct value is employed, or whereas when the values of the preceding sample and the succeeding sample are correct, the mean value compensating method in which the incorrect values are replaced by the mean value between them are used in place. The latter method is preferred because the unpleasant sound is smaller.

In this embodiment, the interleaving shown in FIG. 1 is employed, so that it is possible to fully enjoy the merits of the mean value interpolation.

The compensated audio data are converted into analog signals at the D/A coverters 226a and 226b, separated into two channels at the channel separators 227a and 227b, and passed through the LPFs 228a to 228d where the high-frequency components are suppressed. The signals are then output through the audio outputted terminals 229a to 229d.

The memory address controller 207 provides memory addresses to the recording memory 206 and the playback memory 223 during data writing and data reading.

In the above description, the recording circuit and the playback circuit are shown to be separate, but where the recording and playback operation need not be carried out simultaneously, some of the circuit blocks or part thereof may be used to serve both for recording and playback.

Figure 8:
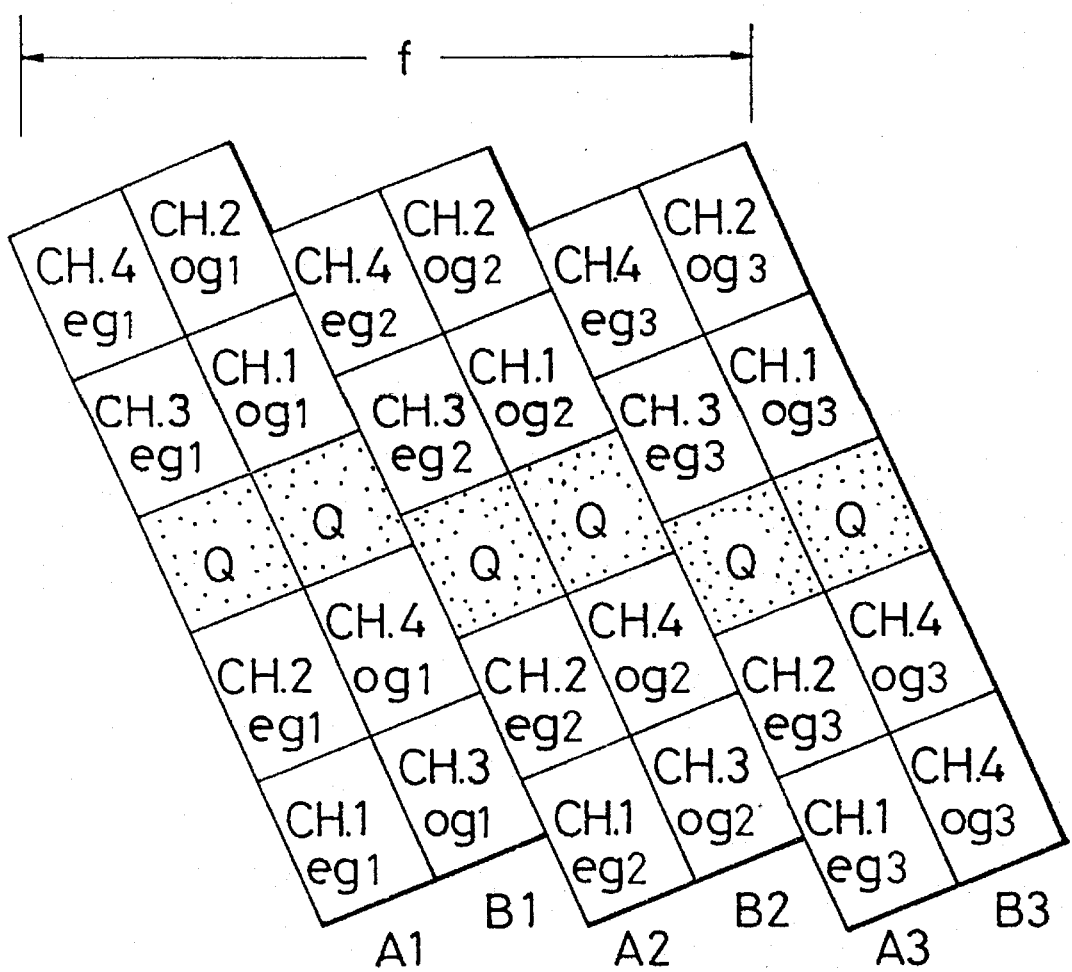
FIG. 8 is a data arrangement diagram showing the interleaving pattern in another embodiment.

Another embodiment of the interleaving according to the present invention will now be described, FIG. 8 is a data arrangement diagram showing the interleaving pattern in this embodiment. The allocation of data samples into sample groups is identical to that shown in FIG. 3, but the disposition of the sample groups is different. The advantages similar to those derived from the interleaving pattern shown in FIG. 1 are also obtained. Apparatus for implement this interleaving can be structured by changing the configuration of the memory and the memory address controller.

The above description concerns a case in which the digital audio signal is recorded and played back corresponding to the video signals of 3 segments each consisting of 2 tracks. But the present invention can be applied to the case where the video signals consist of 3 segments each consisting of 2 tracks, or 3 segments each consisting of 3 tracks, or any other number of segments each consisting of any other number of channels.

Now, the description is made on the case where the video signal of one field is divided into a plurality of segments each consisting of 3 channels.

Figure 9:
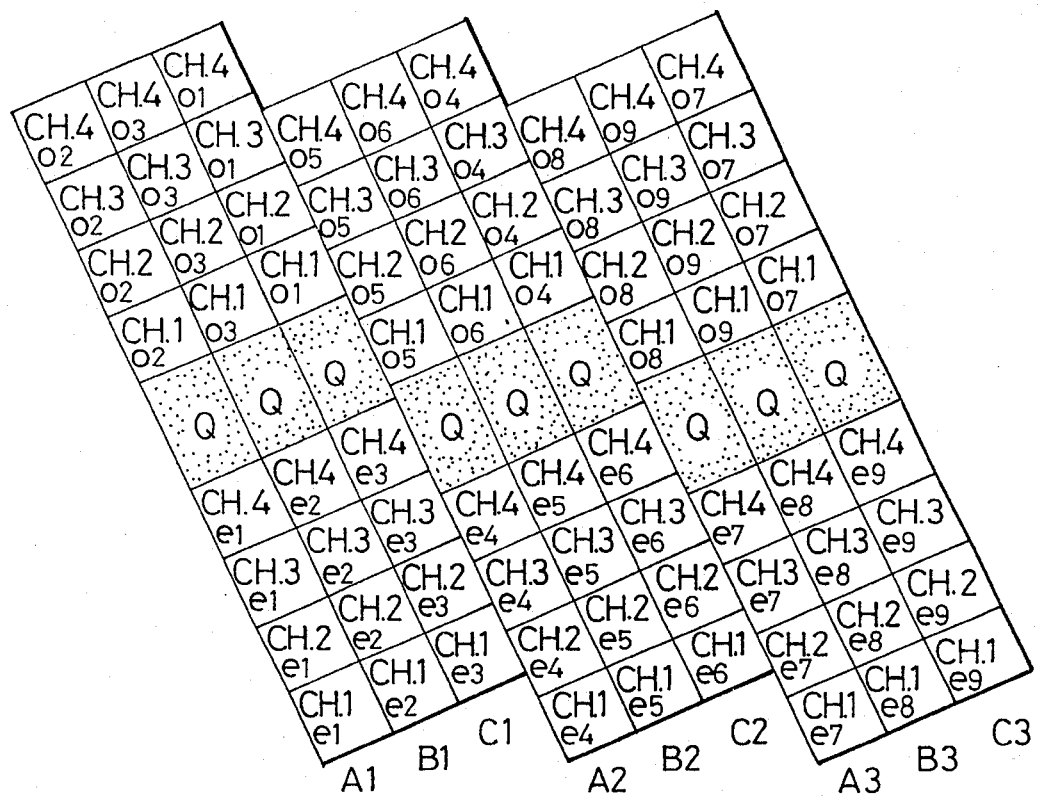
FIG. 9 is a data arrangement diagram showing data interleaving for a case where the video signal of one field is divided into a plurality of segments each consisting of 3 channels.
Figure 10:
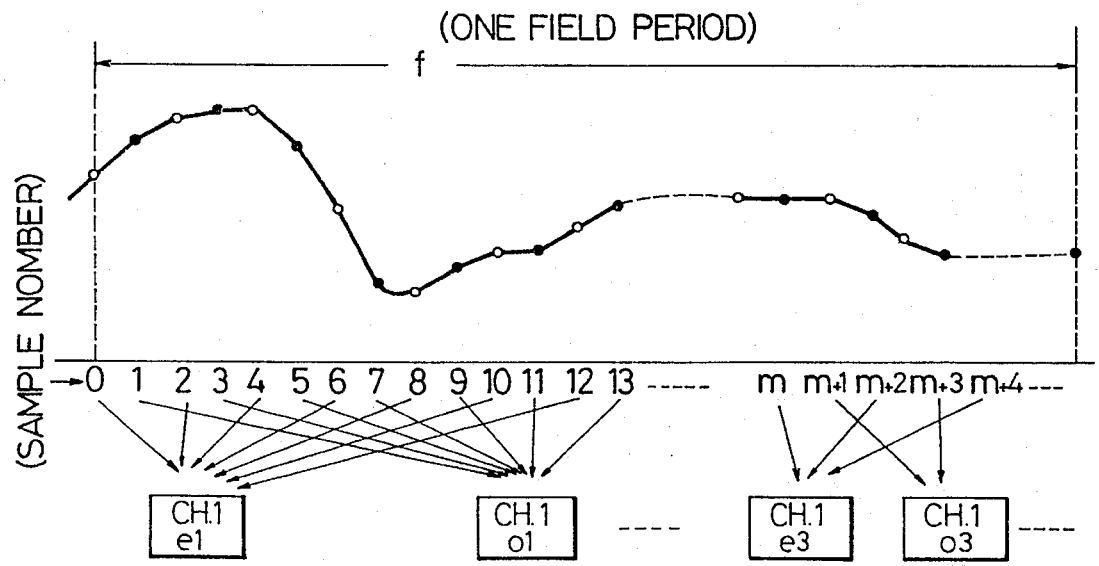
FIG. 10 is a schematic diagram showing the allocation of data in one audio channel for the above mentioned case.

First, an example with 3 tracks×3 segments is described. FIG. 9 is a data arrangement diagram showing data interleaving, and FIG. 10 is a schematic diagram showing the allocation of data in one audio channel. As shown in FIG. 10, samples of one channel inputted or sampled during one field period for each of the channels CH.1, CH.2, CH.3 and CH.4 are divided substantially evenly into 18 groups. If the samples generated per field period are denoted by D0, D1, D2, . . . , these samples are divided into sample groups CH.1e1, CH.1o1, CH.1e2, CH.1o2, . . . , CH.1e9, CH.1o9. The suffix e signifies groups consisting of even samples, whereas the suffix o signifies groups consisting of odd samples.

The sample groups formed for each channel are disposed on tracks as shown in FIG. 9. Q denote cheek symbols. In this interleaving, a group of even samples and a group of odd samples of each channel are disposed, being spaced, in the former part and a latter part within the audio area in tracks. Sample groups containing adjacent samples in each channel are disposed on different tracks, and separated in the longitudinal direction of the tracks, i.e., they are disposed in differently-numbered regions in different tracks.

With such interleaving, advantages similar to those with the track pattern shown in FIG. 1 are obtained.

Error-correcting code structure for the interleaving shown in FIG. 9 will now be described with reference to FIG. 11 which is a code structure diagram (like FIG. 4) and FIG. 12 which is an error-correcting codeword diagram (like FIG. 5).

If the sample frequency is 48 kHz, the number of samples (Nsf) per channel in one field period f is 800.

To distribute the 800 samples×4 channels over 9 tracks, each track must have audio data slots for 356 samples or 712 symbols. To simplify the data structure, each track is provided with slots for 720 audio data symbols, the unused slots being treated as dummy symbols.

Because the number of symbols per track is different from that in the embodiment of FIG. 4, the number of symbols in one block and the number of symbols of the Q error-correcting codewords are different.

Figure 11:
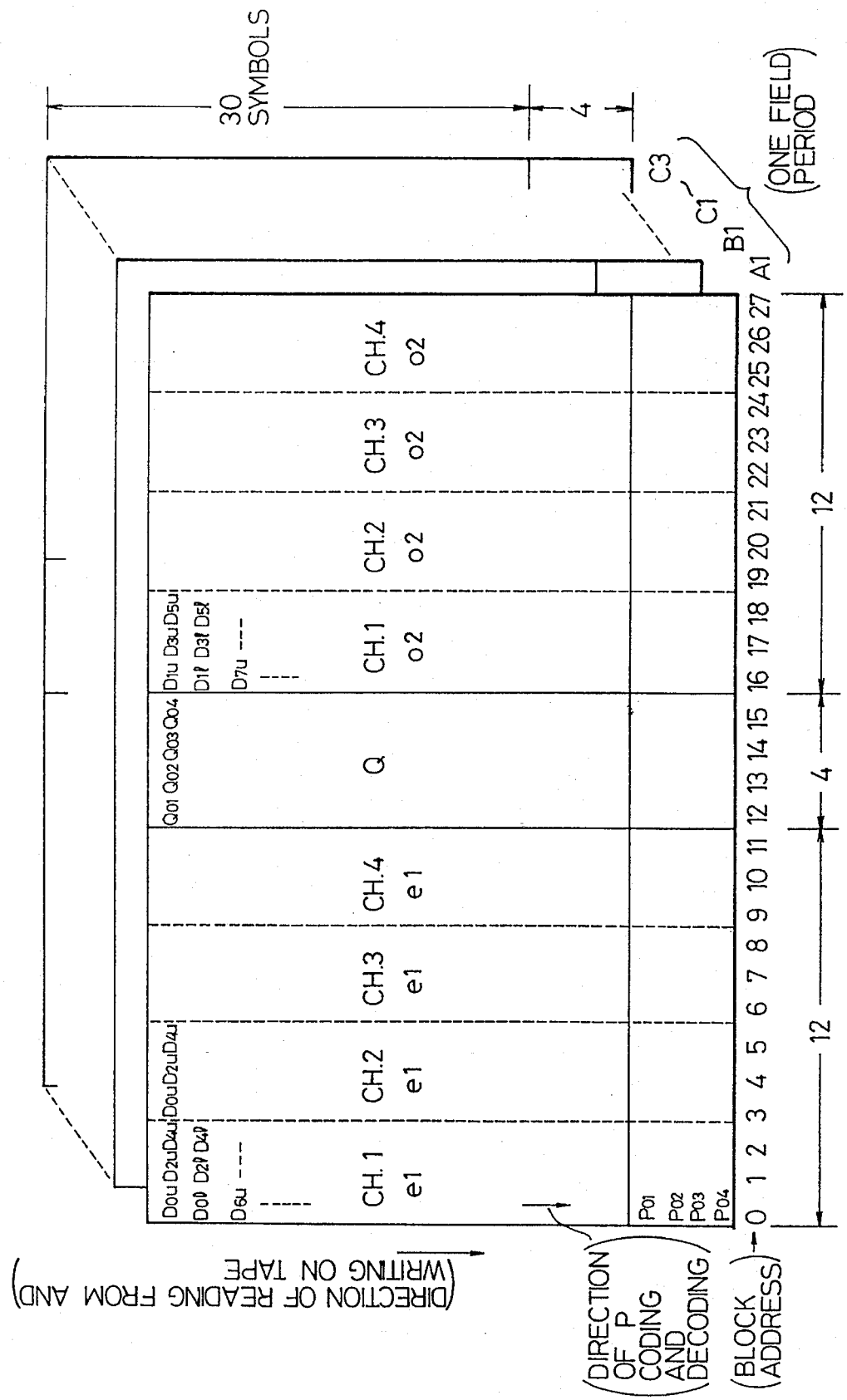
FIG. 11 shows a data arrangement and code structure for explaining error-correcting code structure for the interleaving shown in FIG. 9.

Each block consists of 34 symbols aligned vertically, and the recording on the tape is in the order of the block addresses shown in FIG. 11, so the symbols are read from the memory, one block at a time, and recorded to realize the interleave pattern shown in FIG. 9.

During recording, the sampled audio data of the 4 channels are written in the memory, being allocated in the designated slots in the memory areas for the 9 tracks shown in FIG. 11. During playback, the audio data are read from the designated slots and the original order is restored and outputted to the compensating circuit.

Reed-Solomon (RS) codes on the Galois field $GF(2^8)$ is used to generate the cheek symbols P and Q. If h is the code length, k is the information length, and d is the minimum code distance, then:

P is an (h, k, d)= (34, 30, 5) RS code, and
Q is an (h, k, d)= (28, 24, 5) RS code.

Figure 12:
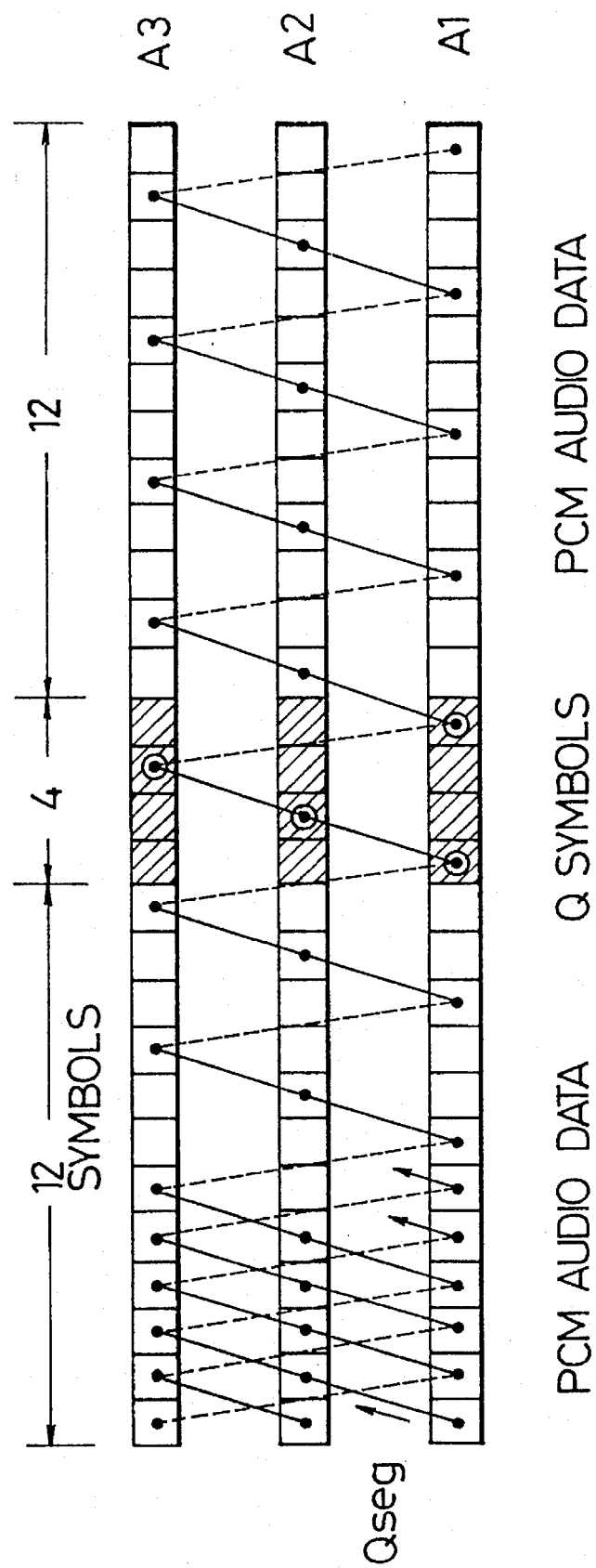
FIG. 12 is an error-correcting code diagram, similar to FIG. 5, for the interleaving shown in FIG. 9.

As shown in FIG. 12, each of the Q error-correcting codewords is completed in three tracks A1, A2 and A3, in the same way as in FIG. 5. With this configuration, the data correcting capability and compensating capability as described earlier are also attained.

Figure 13B:
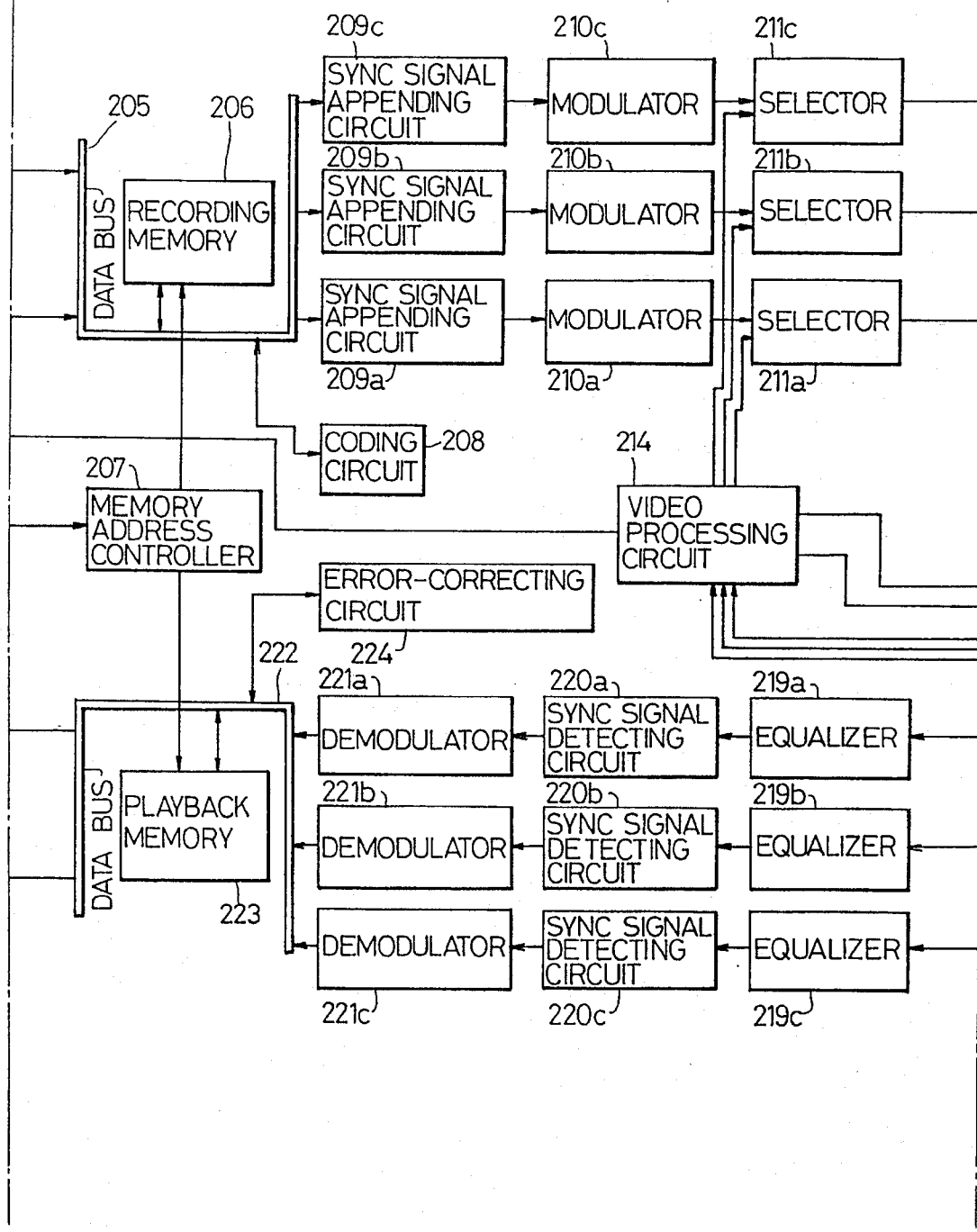
FIG. 13–13C is a block diagram showing another embodiment of the recording and playback apparatus for implementing the interleaving of the audio samples arid code structure shown in FIG. 9.

An embodiment of the recording and playback apparatus for implementing the interleaving of the audio samples and code structure as described above will now be described with reference to FIG. 13. The apparatus shown in FIG. 13 is similar to the apparatus shown in FIG. 6, but differs in the following respects. That is, there are heads for the three channels, and the circuits for recording and playback for tile additional channel is added. The recording memory 206 and the playback memory 223 have a different memory configuration corresponding to the different interleaving structure. Moreover, the memory address controller for data writing and data reading also has different configuration. The procedure for the recording and playback is identical to that shown in the timing chart of FIG. 7.

Figure 14:
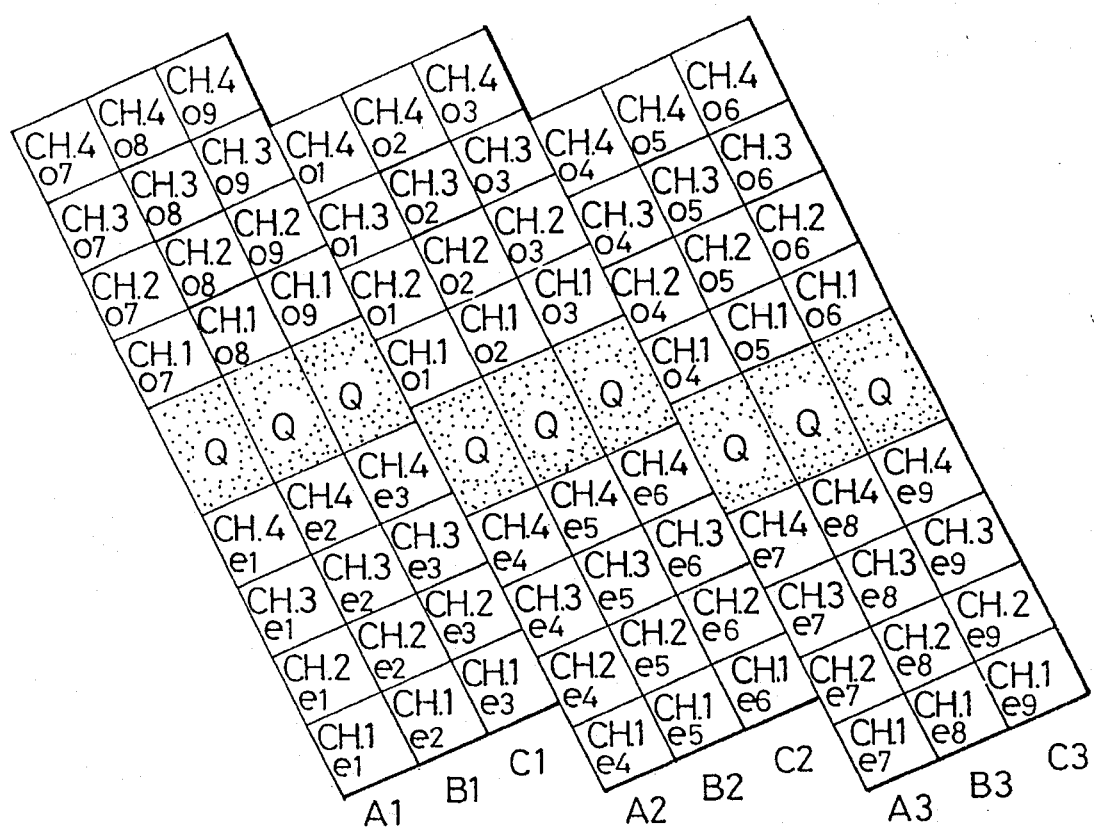
FIG. 14, and FIG. 15 are track pattern diagrams showing data arrangement in further embodiments of the present invention.

FIG. 14 shows a further embodiment of data interleaving according to the invention. In the embodiment shown in FIG. 14, groups containing adjacent samples are disposed in different segments of the same field.

Figure 15:
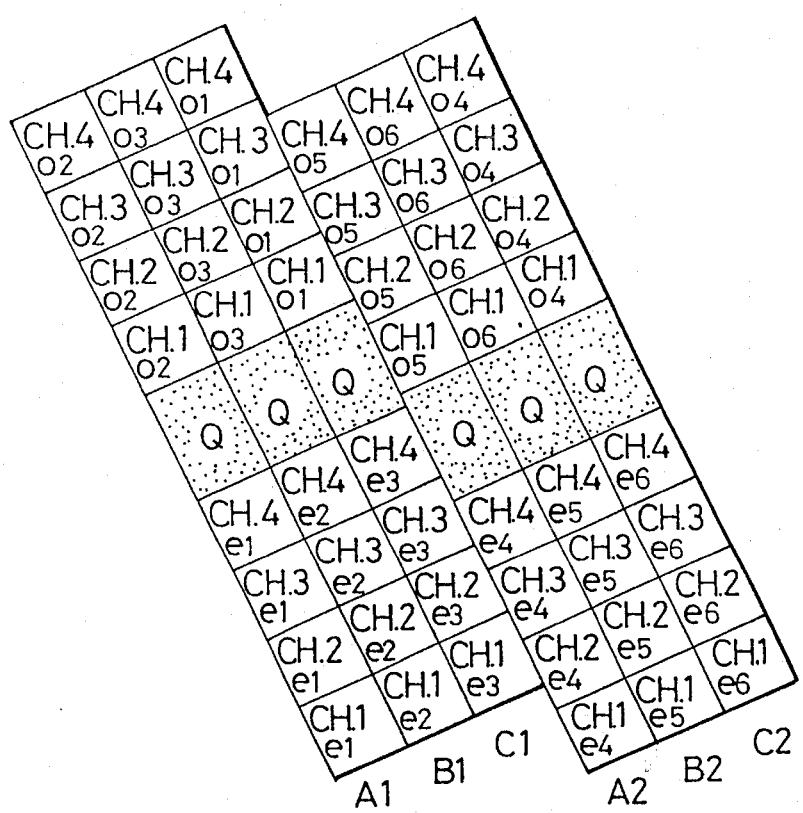

In the embodiments shown in FIG. 9 and FIG. 10, the video signal for one field is divided into 3 channels× 3 segments. The concept described is however applicable to the case where there are 3 tracks×2 segments. FIG. 15 shows an interleaving pattern for such a case.

Figure 16:
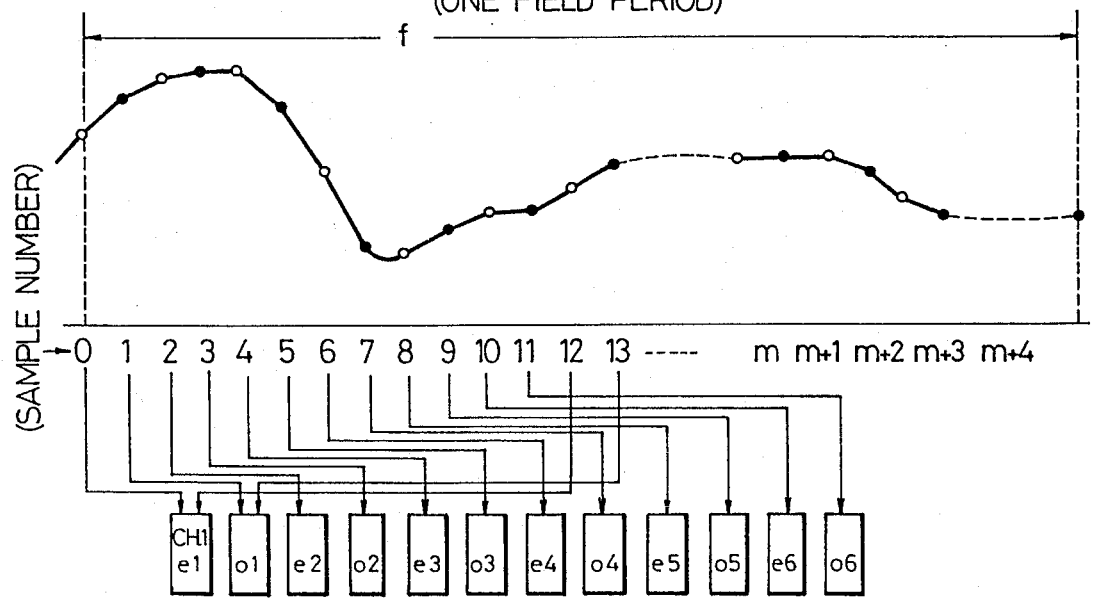
FIG. 16 is a diagram showing data arrangement in a further embodiment of the present invention.

Next, another example of the method of division of data according to the present invention, which is a modification of the embodiment of FIG. 10, is described with reference to FIG. 16.

This example correspond to the division of 3 tracks×2 segments shown in FIG. 15. Like the example of FIG. 3, the samples are divided, according to their order of input, into groups, the interleaving being confined within a field. That is, the samples are divided into 12 groups for 12x, 12x+1, 12x+2, ..., 12x+11 (x=0, 1, ...), according to the order of samples. Any arbitrary sample and a sample adjacent thereto are allocated into different groups, and such groups containing adjacent samples are disposed on different tracks.

Moreover, in the above examples, the audio signals are confined within one field, but audio can be distributed across two fields or one frame.

Figure 17:
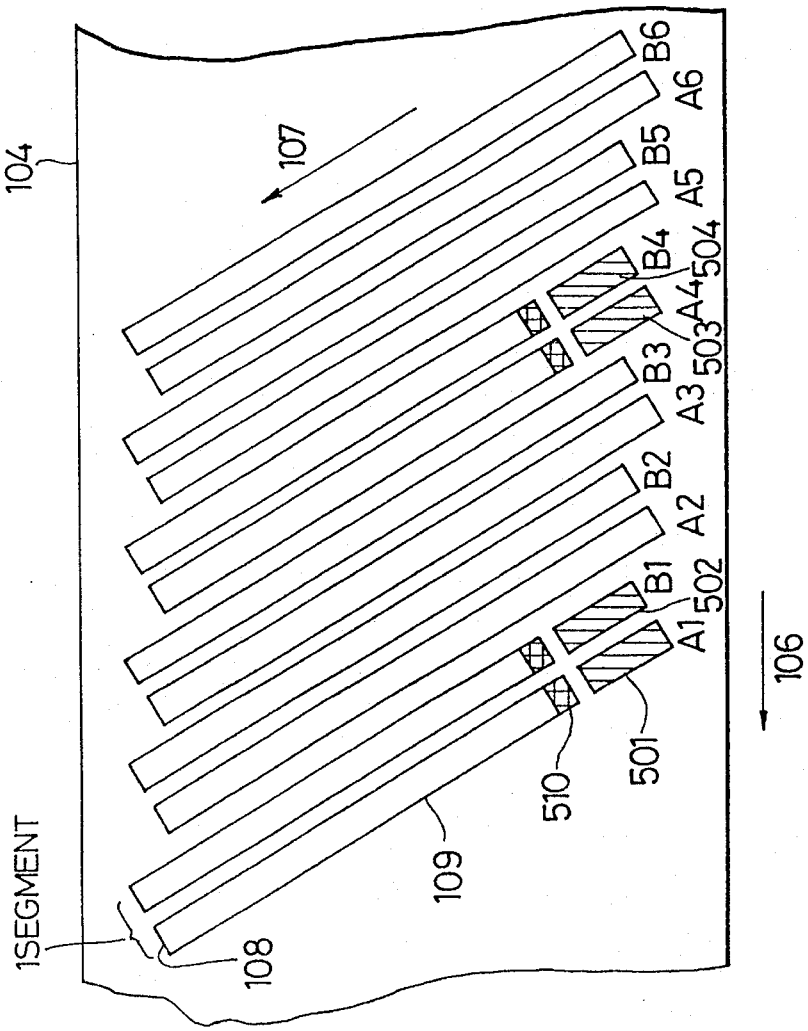
FIG. 17 is a track pattern diagram for a further embodiment of the present invention.
Figure 30:
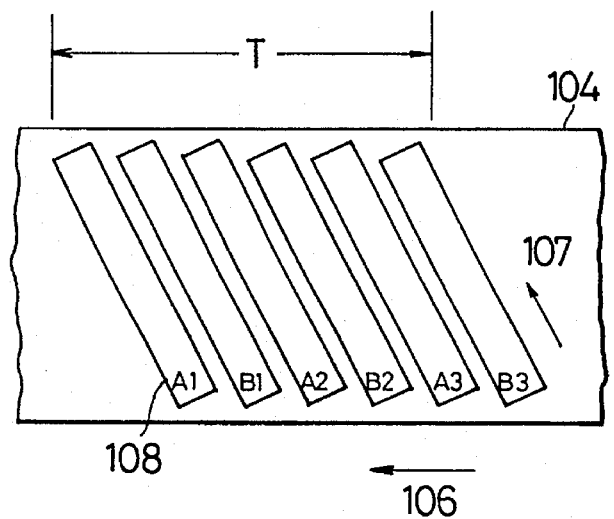
FIG. 30 is a schematic diagram showing a conventional track pattern.
Figure 31:
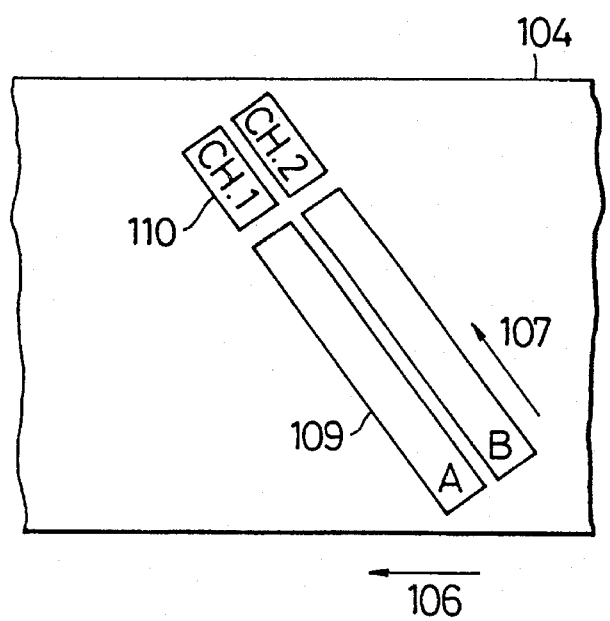
FIG. 31 is a schematic diagram showing another conventional track pattern.

FIG. 17 shows a track pattern according to another embodiment of the present invention. In the embodiments described so far, each track has a region 110 for recording audio signals, but in this embodiment, every third segment has regions 501 to 504 for audio signals in the form of PCM signals. An and Bn (n=1, 2, 3, ...) in the figure correspond to the channels A1, A2, ... B1, B2, ... in FIG. 30. The segments with even suffixes "n" (of An, Bn) are recorded by a pair of heads 102a and 102b. Part of the vertical blanking period of the video signal is used for the regions of the PCM signals. Accordingly, the digitized audio signals can be recorded without altering the video format. The vertical sync. signal is recorded in the sync. signal region 510 provided at the head of the video signal region 109 following the PCM signal regions 501 to 504.

Figure 18:
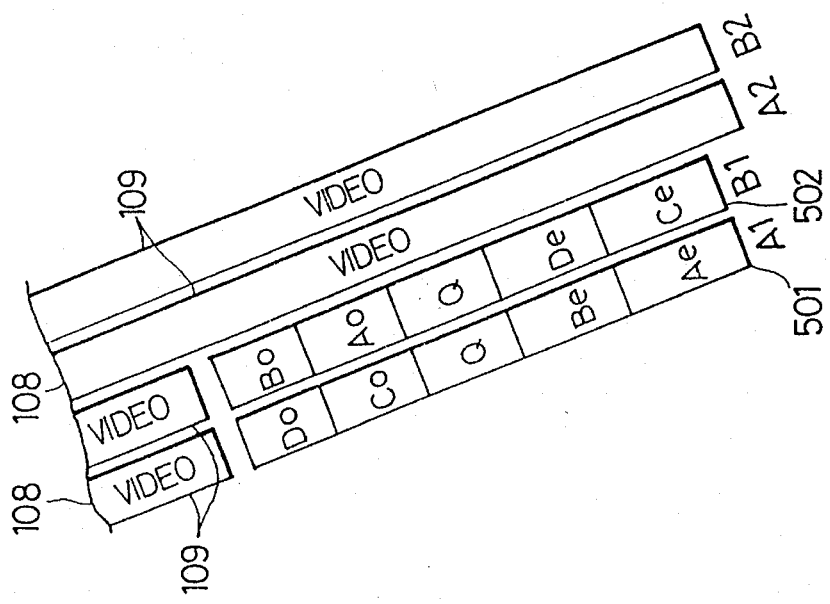
FIG. 18 is a diagram showing arrangement of audio data in a further embodiment of the present invention.

FIG. 18 shows the recording pattern for recording audio signals of four channels (A, B, C, D) and is an enlarged view of the regions 501 and 502 of FIG. 17.

The audio signals for each channel sampled in one video field are divided into a group of even samples and a group of odd samples, which are then recorded in a former part and a latter part of the area for the audio on different tracks. In the figure, the suffixes "e" and "o" of the reference marks A, B, C, D signify the even sample and odd samples. The symbols Q are check symbols of the error correction code completed in one track.

As is clear from FIG. 18, even if there is a drop-out of all samples of the audio signal in one track, the preceding and succeeding samples are unaffected, so the dropped sample can be replaced by a mean value of the preceding and succeeding samples, i.e., by interpolation. If a burst error which extends one half the area for the audio, i.e., the regions 501 and 502 in the direction of the width of the tape occurs, the interpolation is possible.

FIG. 19 shows the timing for recording and playback of audio signals in this embodiment, and corresponds to FIG. 7. The method shown in FIG. 19 differs from the method shown in FIG. 7 in that the signals in one field recorded on the tape are being concentrated at the beginning of each field.

Figure 20:
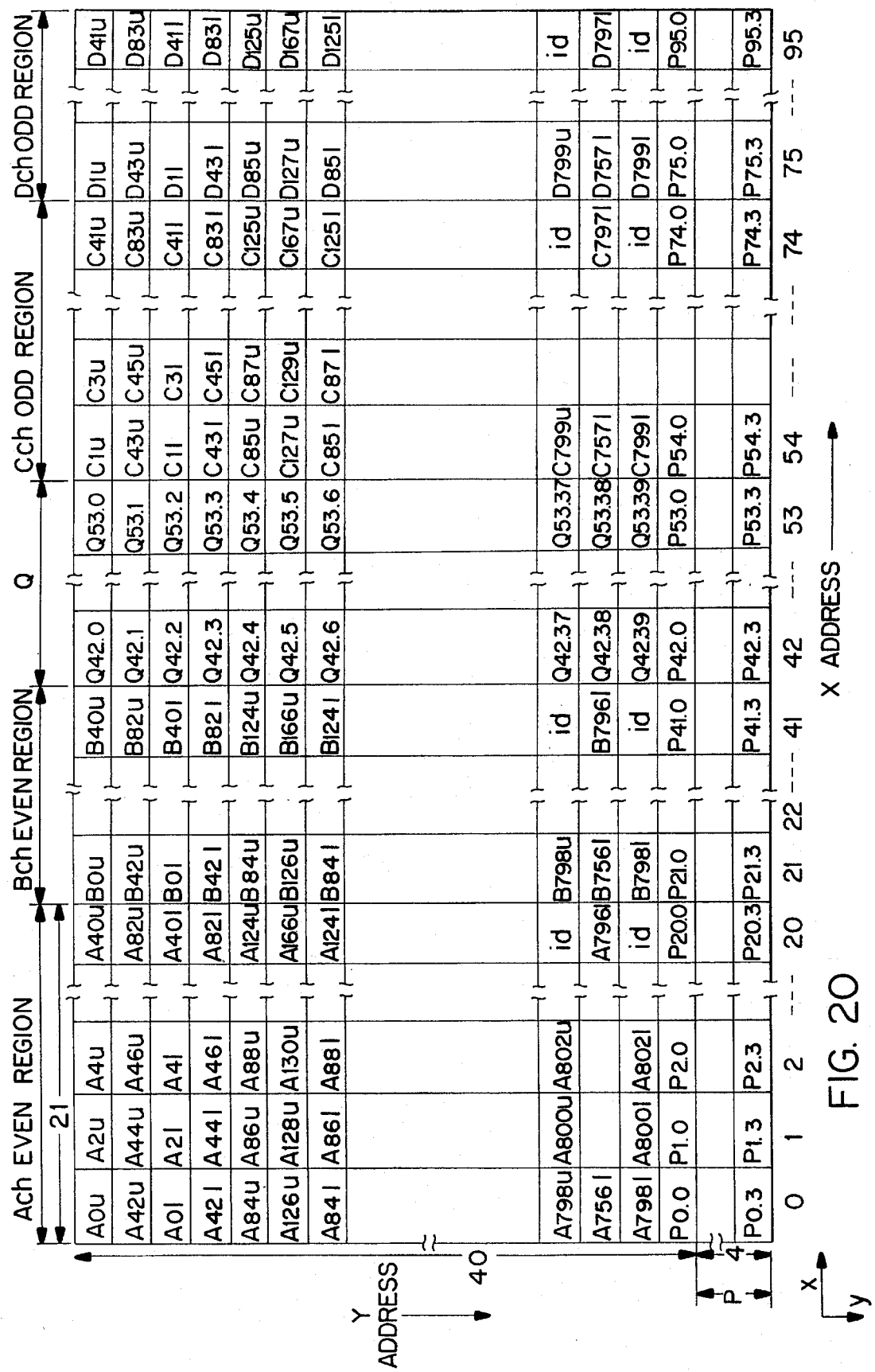
FIG. 20 shows a memory map of this embodiment.

FIG. 20 is a memory map for the above embodiment. In this example, the audio signal sampling rate is 48 kHz, and the number of samples (Nsf) per channel in one filed is 800. To distribute the 800 samples×4 channels over 2 tracks (1 segment), each track must have audio data slogs for 1600 samples or 3200 symbols.

As shown in the memory map of FIG. 20, each of the four audio regions has data slots for 924 symbols, 44 symbols in each vertical array, and 21 symbols in each horizontal array. Of the audio data of one field, the audio data recorded in the audio region 501 in track A1 in FIG. 18 are illustrated. The signal of Ach, Bch, Cch, and Dch are respectively stored at the locations with the x address of 0 to 20, 21 to 41, 54 to 74, and 75 to 95. Q denotes check symbols of the horizontal error-correcting code and stored in the region of the x addresses of 42 to 53. P denotes check symbols of the vertical error-correcting code.

In the figure, the first suffix denotes the order of the sample and the second suffix denotes whether it is an upper (u) or lower (l) byte of the sample.

The audio signals inputted in one field period are stored in the recording memory 206, before being recorded in the audio regions 501 in the A1 track and the audio region 502 in the B1 track.

Then, check symbols of the error-correcting codeword completed in one track are added. In FIG. 20, each data symbol has two error-correcting codewords, and the data symbols are coded, taking each byte as a unit, by, for example of the Reed Solomon code which is often employed for error correction of audio signals.

Each horizontal array comprises three Q error-correcting codewords, each of which consists of three symbols stored at the x addresses 3n, 3n+1, or 3n+2 (n= 0 to 31), and hence comprises 32 symbols. Each of P error-correcting codewords is formed of 44 symbols aligned vertically. One track comprises 96 blocks and the encoded data shown in FIG. 20 are successively read starting with the address x=0. To every 44 symbols, a sync. signal and a block address are added and recorded as one block, so that the recording pattern in FIG. 18 is obtained.

B1 track memory map can be obtained by substituting the even samples Ce of the Cch channel for the even samples Ae of the Ach channel, substituting the even samples De of the Dch channel for the even samples Be of the Bch channel, odd samples Ao of the Ach channel for the odd sample Co of the Cch channel, and odd samples of the Bch channel for the odd samples Do of the Dch channel, and the pattern of FIG. 18 can then be obtained by a similar procedure.

"id" in the figure denote additional information indicating the sample frequency, presence or absence of the emphasis, the number of the channels, the number of quantization bits, or the like, related to the audio signal.

The control over writing and reading is conducted by the memory control circuit 207.

In FIG. 18, the even samples Ce and odd samples Co of the C channel, and the even samples De and the odd samples Do of the D channels may be interchanged. Moreover, an identification signal, other than the vertical sync. signal, with which the start of the video signal of each field can be identified may be recorded in the vertical sync. signal region 510.

The above description relates to a case in which each segment consists of two tracks, but each segment may alternatively consist of three tracks. In such a case, three heads proximate to each other are used for recording and playback.

Figure 21:
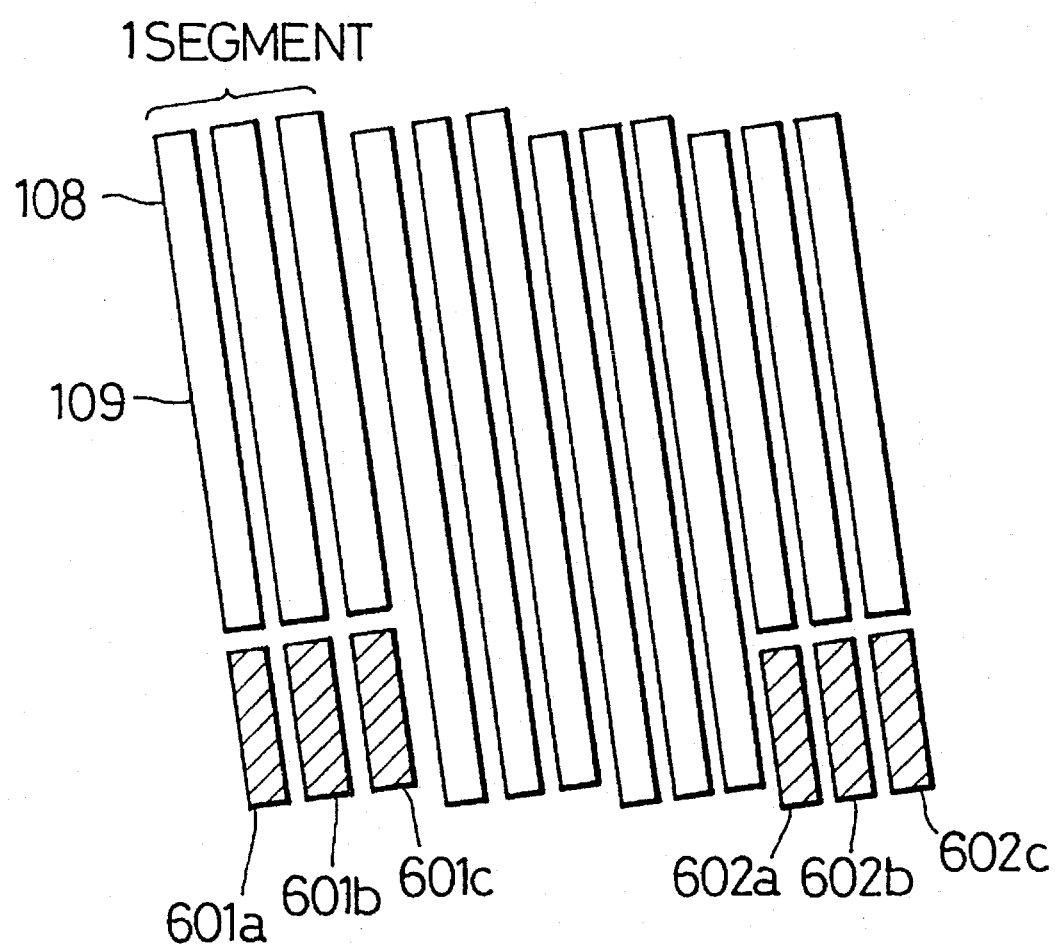
FIG. 21 is a diagram showing the track pattern of the rotary-head recording/playback apparatus of a further embodiment of the present invention.

FIG. 21 shows a track pattern of this embodiment recording in audio regions (such as those 601*a*, 601*b*, and 601*c* or 602*a*, 602*b*, and 602*c*) in adjacent tracks is made substantially simultaneously using three heads.

Figure 22:
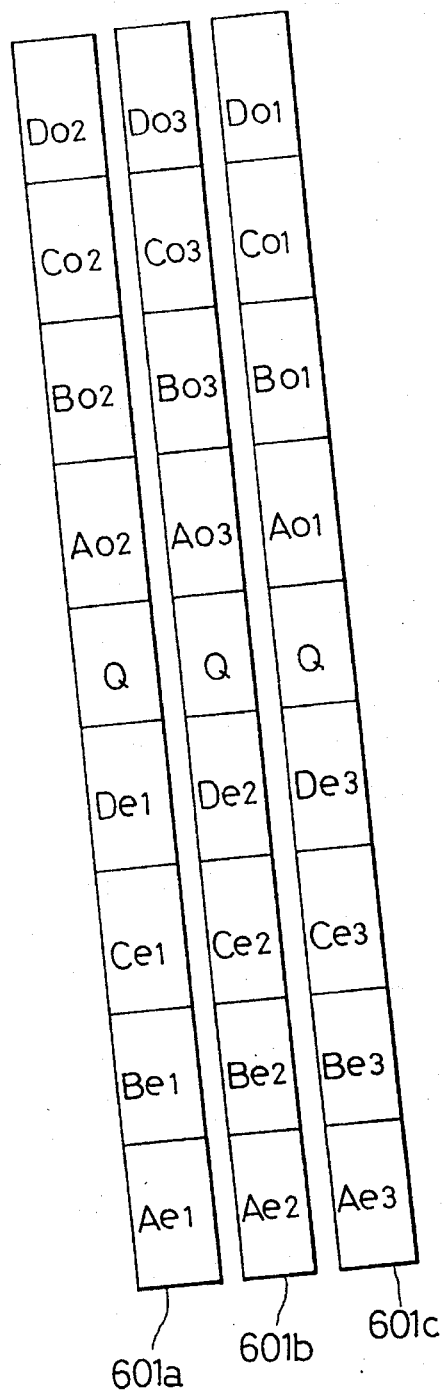
FIG. 22, FIG. 23, FIG. 24, and FIG. 25 are diagrams showing arrangement of data in further embodiments of the present invention.

FIG. 22 shows arrangement of data on the audio regions 601*a* to 601*c*. The area preceding the area for the check symbols of the Q error correction codeword (Q check symbols) and the area succeeding the area for the Q check symbols are respectively divided into four regions, and allocated to rout audio channels A, B, C and D, and the even samples and the odd samples of each audio channel are divided into three, and allocated to three tracks. For instance, the even samples of the A channel are represented by Ae1, Ae2, Ae3. 400 even samples of the A channel W0 to W798 are divided into groups W0 to W266, W268 to W534 and W536 to W798, and the samples W0 to W266 are recorded in Ae1 region, the samples W268 to W534 are recorded in Ae2 region, and the samples W536 to W798 are recorded in Ae3 region. Recording of B to D channels is similar to the recording of the A channel.

Figure 23:
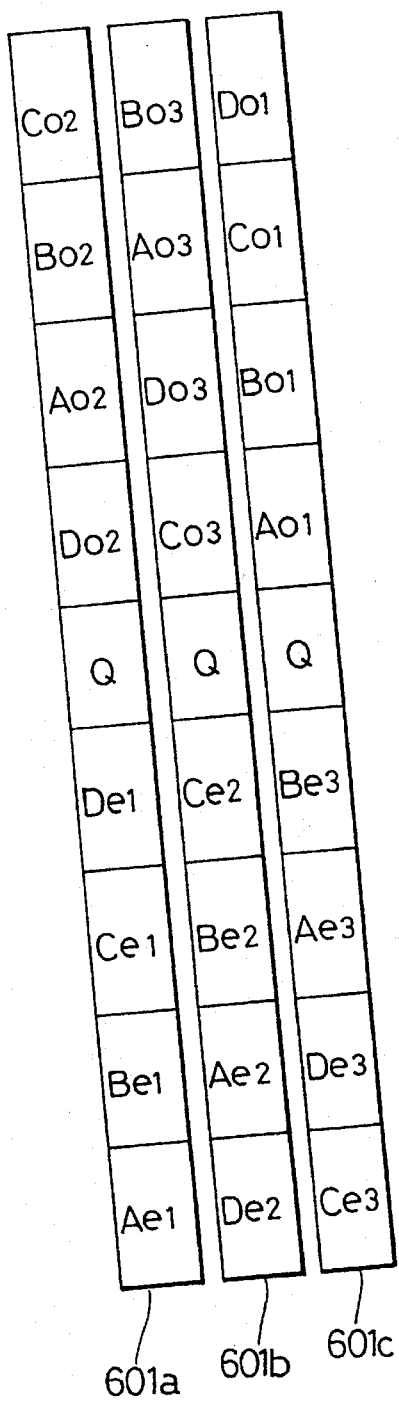

If the samples are arranged in this way, the advantages derived with the embodiment of FIG. 18 are also obtained. FIG. 23 shows a modification of FIG. 22. In this modification, the even samples and the odd samples obtained by dividing each channel into three are separated in the longitudinal direction of the tracks so that they are not juxtaposed, i.e., they are in the differently-numbered regions of the different tracks. With this arrangement, when for instance a burst error occurs in the longitudinal direction of the tape with the width of the Ae1 region, the compensation that will be necessary are not concentrated on any particular channel. This is in contrast to the case of the arrangement of FIG. 22 with which the compensation that will become necessary are concentrated on the A channel.

Figure 24:
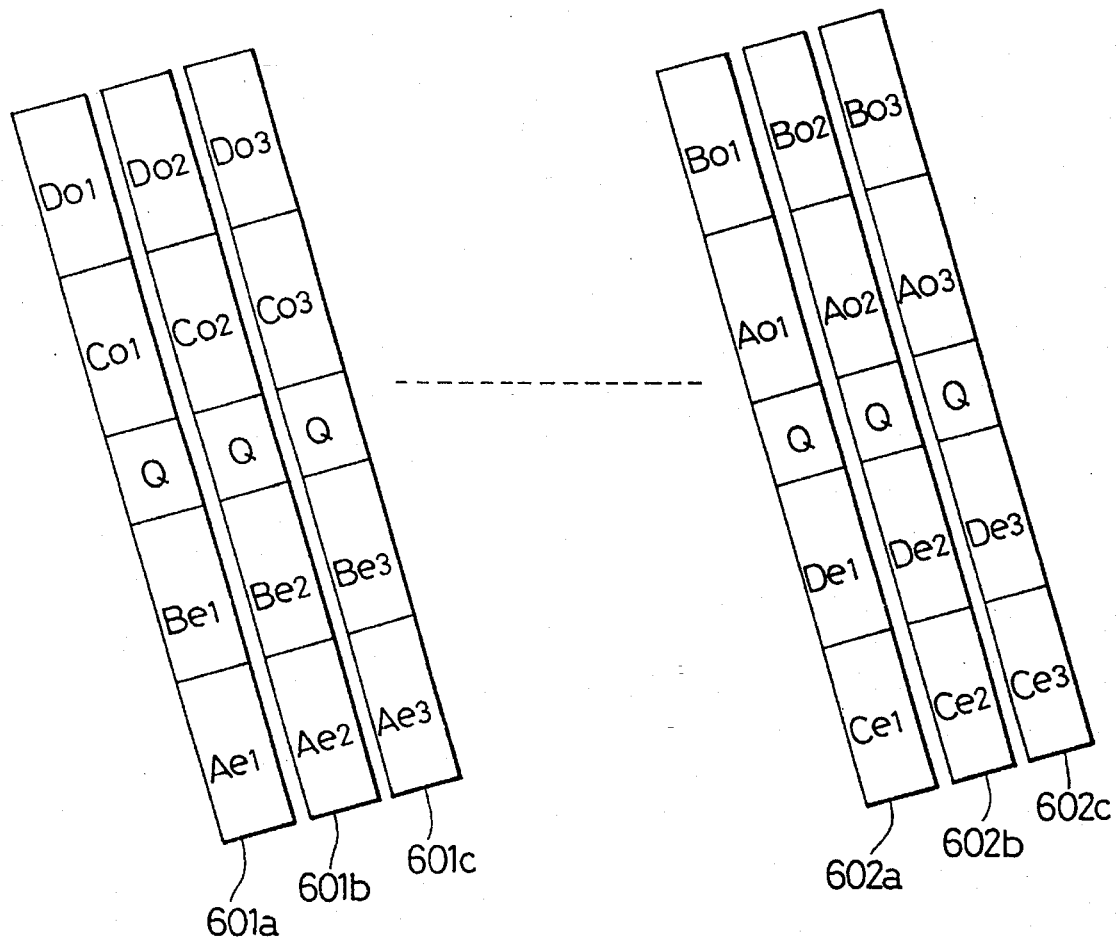

In the above embodiment, interleaving was confined within one field period, but It may spreads across two field periods or one frame period. It should be noted that the tracks 601*a* to 601*c* are in a field different from the field in which the tracks 602*a* to 602*c* are in. That is, in the interleaving completed in two fields, the audio data generated in two field periods are divided into even groups and odd groups, which are then distributed in the audio regions in two fields. An example of such an arrangement is shown in FIG. 24. In this example, the number of samples in each region is about twice that of the embodiment of FIG. 23. The even samples W0 to W530, W532 to W1062, and W1064 to W1598 are recorded in the regions Ae1, Ae2 and Ae3, respectively. Odd samples of the A channel, and even and odd samples of other channels are recorded in a similar manner. With this arrangement too, the advantages derived from the earlier-described embodiments are also obtained. Furthermore, in this embodiment, even if all the data in the three tracks 601*a* to 601*c* are lost, the mean value compensation is possible. So this embodiment is more reliable than the system in which the interleaving is completed in one field.

The method of division as explained with reference to FIG. 16 may also be used, but still the same advantages are derived.

The embodiment described above can be implemented by changing the clock generating circuit 230 and the memory control circuit 207.

Figure 25:
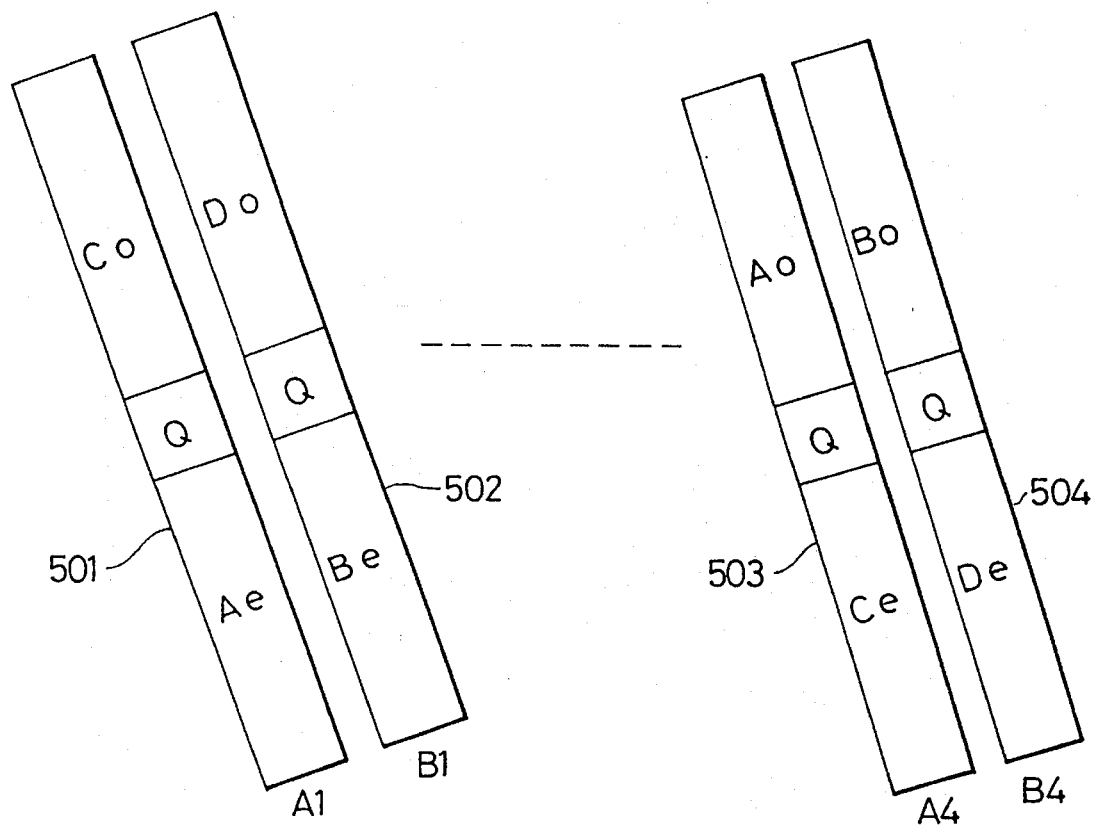
Figure 26:
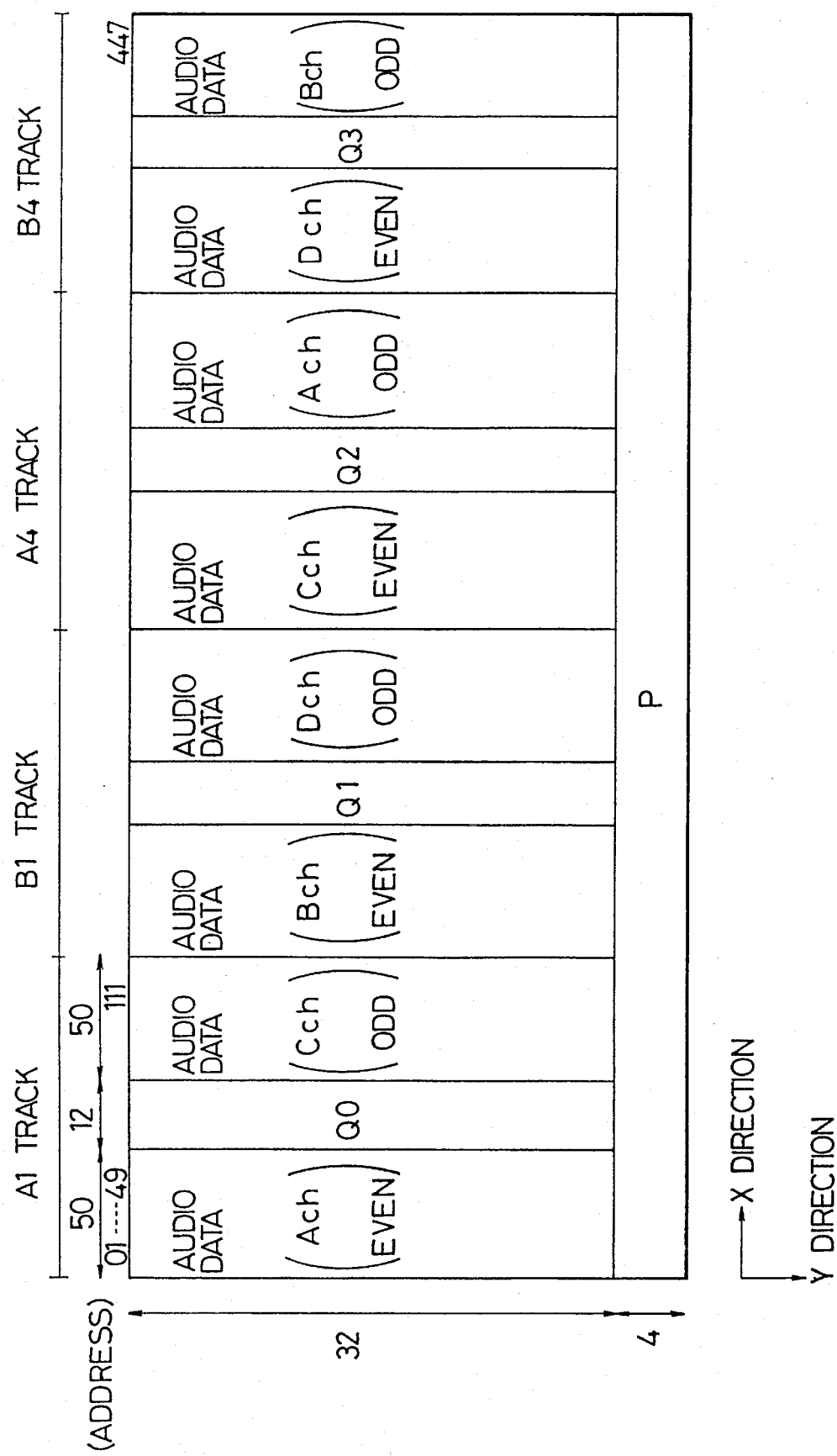
FIG. 26 shows a memory map for the embodiment of FIG. 25.

FIG. 25 is a modification of the embodiment of FIG. 18. In this modification, the interleaving is made across two fields. FIG. 26 is a schematic diagram of the memory configuration of this embodiment.

In this example, if the sample frequency of the audio signal is 48 kHz, the number of samples (Nsf) per channel in one frame, i.e., per 1/30 sec., is:

$$Nsf = 48,000/30 = 1600.$$

To distribute 1600 samples × 4 channels over 4 tracks (2 segments), each track must have audio data slots for 1600 samples or 3200 symbols.

In FIG. 26, a memory is shown to have 8 audio regions for about 1600 symbols, each audio region having 32 symbols in each vertical array and 50 symbols in each horizontal array. The even samples and odd samples of the audio data of one frame are stored separately. Then, check symbols are generated from the fifty symbols in the Ae region and Co region, and stored in the Qo region. Similarly, check symbols for x direction are also generated for other samples.

Then 32 symbols aligned in the y direction are used to generate cheek symbols, which are then stored in the P region.

The audio data with the appended cheek symbols are read one block at a time, each block consisting of 36 symbols, and blocks stored at the x addresses 0 to 111 are recorded on the A1 track. Similarly, data are read from memory and recorded on the audio regions in B1 track, A4 track, B4 track. In this way, the recording pattern of FIG. 25 is obtained.

The control over the writing and recording is made by the memory control circuit 207.

Figure 27A:
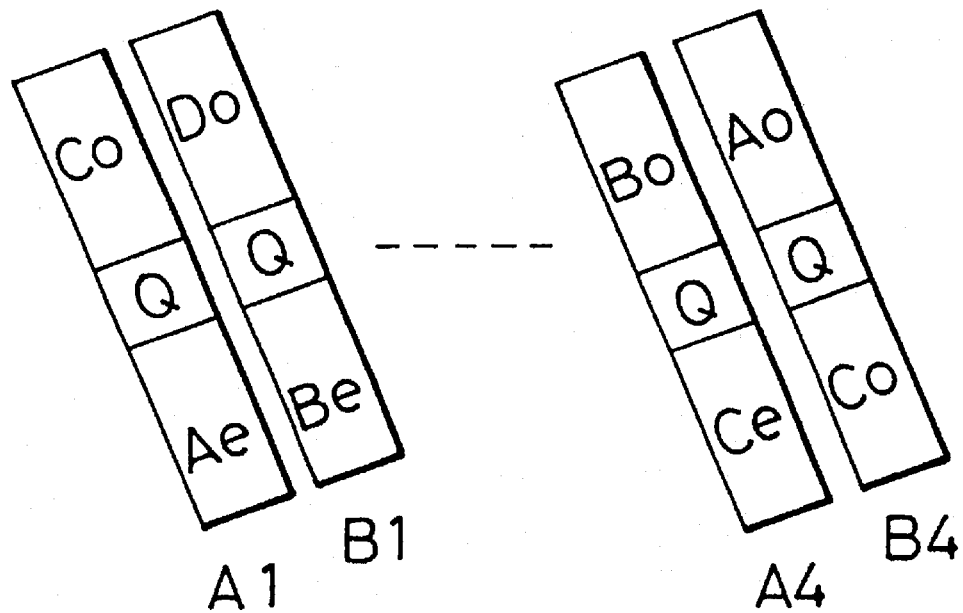
FIG. 27A, FIG. 27B and FIG. 28 are diagrams showing arrangement of audio data in further embodiments of the present invention.
Figure 27B:
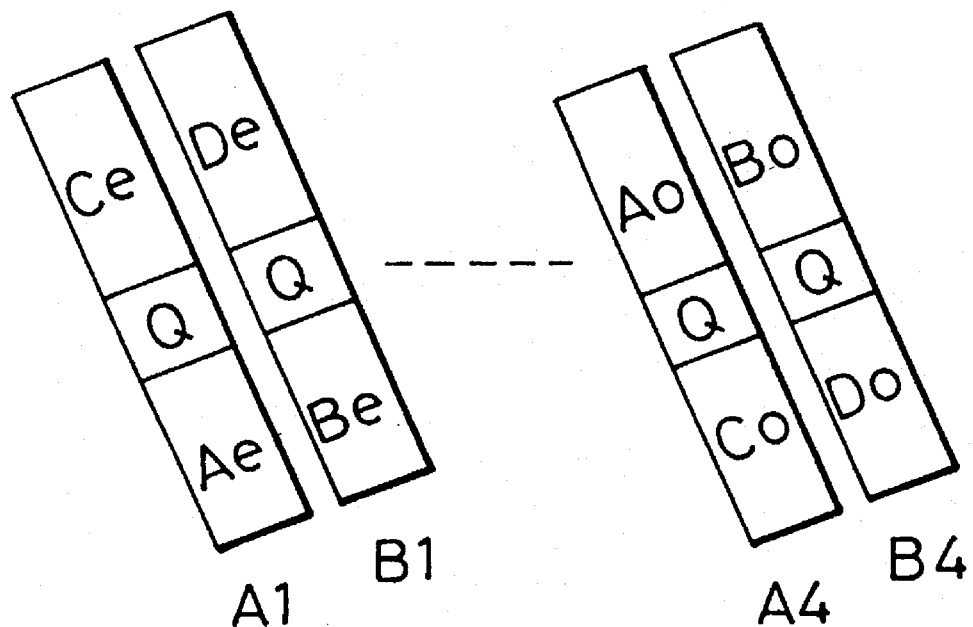

FIG. 27A and FIG. 27B show track patterns in further embodiments of the present invention. They are modifications of FIG. 25. The difference of FIG. 27A from FIG. 25 is that Ao and Bo are interchanged. The difference of FIG. 27B from FIG. 25 is that Co and Ce; and Do and De are interchanged. The track patterns shown in FIG. 27A and FIG. 27B can be realized by changing the order of reading from the memory, which is determined by the memory control circuit 207.

Figure 28:
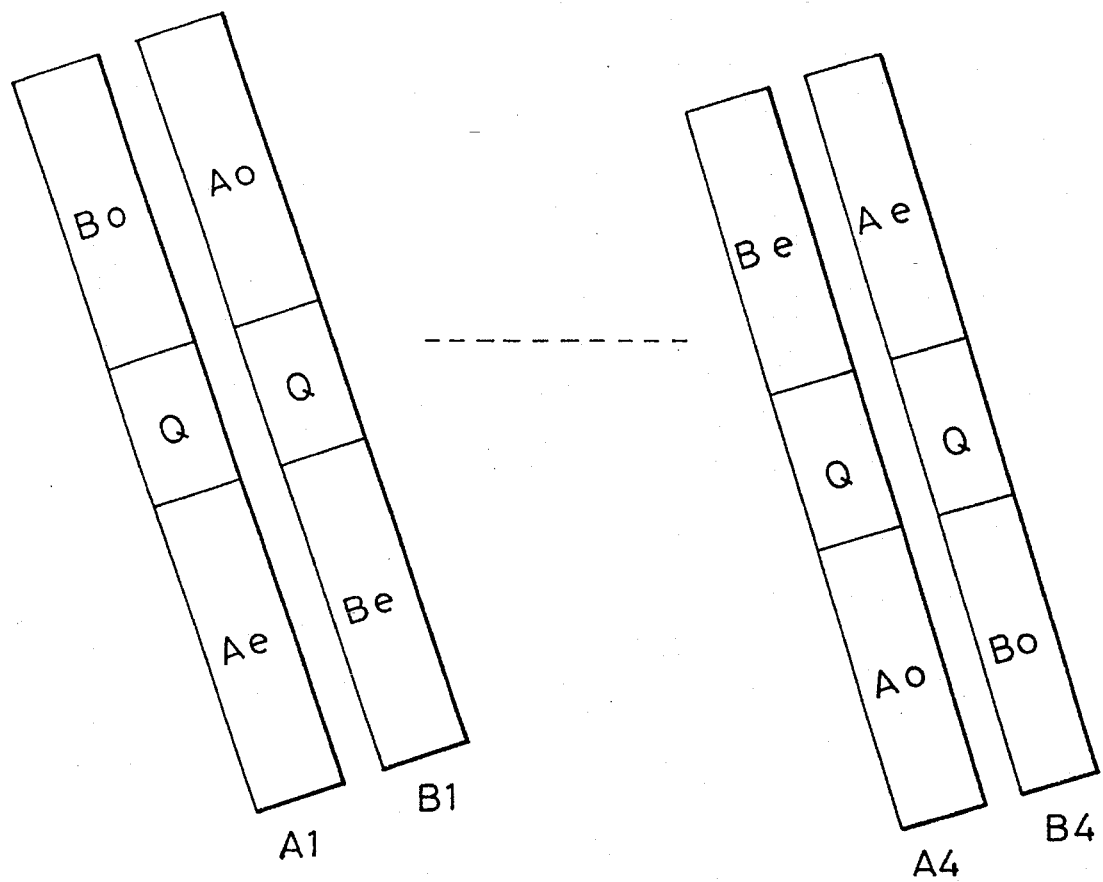
Figure 29:
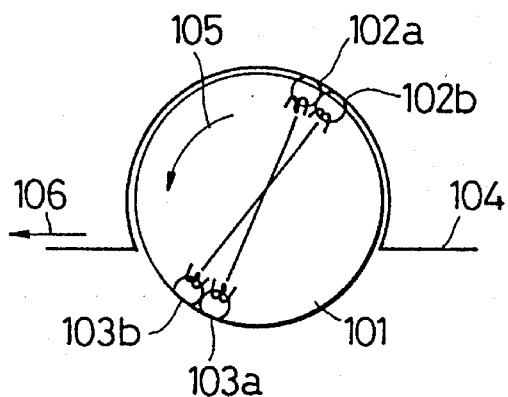
FIG. 29 is a schematic view following a rotary drum and magnetic heads in a VTR.

In the embodiments described above, the audio data comprise 4 channels, but the audio data may comprise two channels. An example is shown in FIG. 28. In this example, the audio data of two channels are written in duplicate (i.e., the same audio data are written at two locations), and the even samples and the odd samples of each channel are written in different tracks and at the former part and the latter part. Accordingly, even if drop-out of the signal occurs over one track, or over in half the area in the direction of the width of the tape, no compensation need be made but the correct audio data can be reproduced.

The track pattern of this embodiment can also be realized by changing the order of the reading frown the memory. In the above embodiment, the data generated in one frame are recorded in 2 segments but, by recording a flag indicating the number of recorded samples audio data over a period shifted from the one frame period of video signal, may be recorded as a unit. This modification is useful where the video frame and the audio sampling frequency are not synchronous.

The embodiments described relate to audio signals, but the present invention is also applicable to digital data other than audio digital data.

As has been described according to the present invention, the digital information signals are divided according to their order of input or sampling into m×n sample groups, i.e., {(m×n)×1}-th sample group to {(m×n)×1+ (m×n)−1}-th sample group, and one of m×n sample groups is disposed in one track, and the sample groups containing adjacent samples are separated from each other in the longitudinal direction of the tracks, and the error-correcting codeword is formed to interleave across a plurality of tracks in the m×n tracks, and not to contain adjacent samples. Accordingly, compensating capability against head clogging and a burst error due to a scratch is enhanced.

In another embodiment, data interleaving is so made that any arbitrary sample and the sample adjacent thereto are not contained in the same track, and separated from each other in the longitudinal direction of the tracks, and the error-correcting codeword is so formed to interleave across a plurality of tracks, so compensating capability is enhanced.

Furthermore, when the time-axis compressed audio signal is recorded in the region preceding the recording of the video signal of each field, the conventional video signal recording format need not be changed, so the compatibility with the conventional apparatus is retained.

What is claimed is:

1. An apparatus for recording digital information signals from two or more channels, the information signals being inputted for a predetermined time, on a recording medium to form four or more tracks, the information being distributed along the tracks, each track having a number of regions equal to the number of channels, the digital information signals being divided into m number of groups for each channel, m being equal to the number of tracks, comprising:

recording signal processing means for interleaving the digital information signals and for outputting the interleaved digital information signals onto the recording medium to form the four or more tracks; and recording means for recording the signals supplied from said recording signal processing means on the recording medium to form the tracks;

said recording signal processing means dividing the digital information signals into odd samples and even samples for each channel, dividing the odd samples for each channel into m/2 sample groups and dividing the even samples for each channel into m/2 sample groups, consecutive samples of a same channel being assigned to different sample groups;

said recording signal processing means interleaving the sample groups such that the sample groups recorded in the regions of each track are from different channels and sample groups containing consecutive samples of a same channel are located in different regions of adjacent tracks, the different regions being formed at different positions in a longitudinal direction of the tracks.

2. The apparatus as claimed in claim 1, wherein said recording signal processing means includes coding means for coding error detection and error correction information into the digital information signals, each audio data being encoded by two codewords for error detection and error correction, one of said codewords for error detection and error correction being completed over a plurality of tracks and adjacent samples of the same channel being contained in different codewords.

3. The apparatus as claimed in claim 1, further comprising:

playback means for scanning tracks recorded on the recording medium to playback digital information signals; and playback signal processing means for rearranging the digital information signals played back by said playback means, the rearrangement changing an order of the samples into an original sample order, before interleaving, for each channel.

4. A rotary-head playback apparatus for performing sequential scanning along four or more tracks formed on a recording medium to playback digital information signals of a predetermined time, each track having a m number of regions, m being equal to a number of channels, the digital information signals being distributed over the regions of the tracks, the digital information signals for each channel being divided into even and odd samples, the even samples of each channel being divided into m/2 sample groups and the odd samples of each channel being divided into m/2 sample groups, such that consecutive even samples and consecutive odd samples are assigned to different sample groups, sample groups containing consecutive samples of a same channel being located in adjacent tracks at different regions, the different regions being formed at different positions in a longitudinal direction of the tracks, comprising:

playback means for scanning the tracks to reproduce signals;

playback signal processing means for receiving digital information signals formed by samples produced by said playback means, for rearranging, for each channel, the samples of the tracks as a unit, and for outputting the rearranged samples; and signal compensation means for receiving the rearranged samples from said playback signal processing means and for compensating samples in which an error has occurred, by using a sample from a track adjacent to the track having the sample with the error;

said playback signal processing means grouping samples associated with a channel for a predetermined time period from different regions and different tracks and outputting the samples after having been restored to an original sample order.

5. The apparatus as claimed in claim 4, wherein said playback signal processing means includes decoding means for performing error detection and error correction using error detection and correction codewords coded over a plurality of tracks on the recording medium.

6. A method for recording digital information signals of n channels, n being an integer equal to or greater than two on a recording medium, the digital information signals being distributed across m tracks, m being an even number equal to or greater than four, each track having n regions, comprising the steps of:

(a) dividing the digital information signals for each of the n channels for a predetermined time into m groups so that the digital information signals are recorded in a number of regions equal to a product of n and m;

(b) dividing even samples and odd samples of the digital information signals for each channel into m/2 number of sample groups, respectively, the sample groups of different channels being allocated to the n regions in each track, consecutive samples being assigned to different sample groups; and (c) recording sample groups containing consecutive samples for a same channel in adjacent ones of the m tracks at different regions, the different regions being formed at different positions in a longitudinal direction of the tracks.

7. The method as claimed in claim 6, further comprising the step of:

(d) coding at least two codewords for error detection and error correction for each digital information signal;

said step (d) coding at least one of the codewords over a plurality of tracks and coding the codewords such that adjacent samples in the same channel are contained in different codewords.

8. A method for performing sequential scanning along m, where m is an even number greater than or equal to four, number of helical tracks formed on a recording medium to playback digital information corresponding to a plurality of channels, each track having a plurality of regions, the digital information signals being divided into even and odd samples, the even and odd samples being divided into m/2 sample groups such that consecutive even samples and consecutive odd samples are assigned to different sample groups, sample groups containing consecutive samples of a same channel being located in adjacent tracks at different regions, the different regions being formed at different positions in a longitudinal direction of the tracks, comprising the steps of:

(a) forming digital information signals for each channel from signals played back from the regions of different tracks; and (b) outputting the digital information signals after having restored the digital information signals to an original sampling order.

9. The method as claimed in claim 8, further comprising the step of:

(c) performing detection and error correction using coded error detection and correcting codewords which are interleaved over the plurality of tracks.

10. An apparatus into which digital information signals of n channels, n being an integer equal to or greater than two, are inputted for a predetermined time and recorded on a recording medium, comprising:

signal processing means for interleaving digital information signals of n channels inputted for a predetermined time and for outputting the interleaved signals;

recording means for recording the signals formed of samples supplied from said signal processing means onto the recording medium to form m tracks, each track having a number of regions equal to a product of n and two, the digital information signals for each channel being divided into a number of groups equal to a product of m and two, the digital information signals being recorded in the regions over m tracks;

said signal processing means interleaving the samples such that even samples for each channel are divided into m sample groups and odd samples for each channel are divided into m sample groups, respectively, consecutive samples are assigned to different sample groups, one of the even sample groups and one of the odd sample groups, for each channel, are disposed in each track, and sample groups containing consecutive samples for a same channel are recorded in different tracks and at different regions, the different regions being formed at different positions in a longitudinal direction of the tracks.

11. The apparatus as claimed in claim 10, wherein said signal processing means codes each recording signal with at least two codewords for error detection and error correction, said codewords extending across m tracks such that at least one of the codewords is recorded over a plurality of tracks and adjacent samples for the same channel are contained in different codewords.

12. The apparatus as claimed in claim 10, further comprising:

playback means for scanning tracks formed on the recording medium to playback digital information signals; and playback signal processing means for receiving the signals played back by said playback means and for rearranging, for each channel, the digital information signals of m tracks, as a unit, into an original sampling order.

13. A rotary-head playback apparatus for sequential scanning along m number of tracks formed on a recording medium to playback digital information signals, m being equal to or greater than 2, each track having a plurality of regions, the digital information signals being distributed across the regions, the digital information signals being divided into even and odd samples, the even and odd samples each being divided into m/2 sample groups such that consecutive even samples and consecutive odd samples are assigned to different sample groups, sample groups containing one of consecutive odd samples and consecutive even samples of a same channel being located in non-adjacent tracks, comprising:

playback means for scanning the tracks to produce digital signals;

playback signal processing means for receiving the digital signals formed of samples played back by said playback means, for rearranging, for each channel, the digital signals of the tracks as a unit, and for outputting the rearranged signals; and signal compensating means for receiving the rearranged signals from said playback signal processing means and for compensating samples in which an error has occurred using a sample adjacent thereto;

said playback signal processing means forming digital information signals for one channel from signals played back from the plurality of regions of m tracks, each track having a region containing even samples and a region containing odd samples.

14. The apparatus as claimed in claim 13, wherein said playback signal processing means includes decoding means for performing error detection and error correction using error detection and correction codewords recorded in a plurality of tracks.

15. A recording method in which digital information signals of n channels, n being an integer equal to or greater than two, are inputted for a predetermined time and recorded on a recording medium, the digital information signals being distributed across m tracks, m being a number equal to or greater than four, each track having a number of regions equal to a product of n and two, comprising the steps of:

(a) dividing the digital information signals for each channels into groups;

(b) dividing the digital information signals for each channel into m sample groups of even samples and m sample groups of odd samples such that consecutive samples are assigned to different sample groups, respectively, the sample groups of different channels being allocated to different regions in each track; and (c) recording sample groups containing consecutive samples for a same channel in different tracks and at different regions, the different regions being formed at different positions in a longitudinal direction of the tracks.

16. The method as claimed in claim 15, further comprising the step of:

(d) coding a plurality of error detection and error correction codewords for the digital information signals;

said step (d) coding at least one of the codewords over a plurality of tracks such that adjacent samples in the same channel are contained in different codewords.

17. A playback method for performing sequential scanning along tracks formed on a recording medium to playback digital information signals, each track having a plurality of regions, the digital information signals being distributed across the regions of m tracks, m being an integer equal to or greater than four, the digital information signals being divided into even and odd samples, the even and odd samples each being divided into m/2 sample groups such that consecutive even samples and consecutive odd samples are assigned to different sample groups, sample groups containing one of consecutive odd samples and consecutive even samples of a same channel being located in nonadjacent tracks, comprising the steps of:

(a) forming digital information signals of one channel from signals played back from the regions of m different tracks; and (b) performing error detection and error correction using error detection and correcting codewords pre-recorded in a plurality of tracks of the m tracks.

18. An apparatus for recording video signals and digital information signals of N channels, N being an integer equal to or greater than two, comprising:

a plurality of sets of M heads, M being an integer equal to or greater than two, mounted in proximity to each other;

recording signal processing means for dividing the digital information signals of N channels into groups, for dividing even samples of each channel into M groups and odd samples of each channel into M groups such that consecutive odd samples and consecutive even samples are assigned to different groups, and for outputting the groups;

coding means for coding error detection and error correction codewords; and recording means for sequentially recording signals outputted from said recording signal processing means into a magnetic tape to form tracks inclined with respect to a direction corresponding to a length of the magnetic tape, for each scanning by each set of M heads one segment consisting of M tracks is recorded, said recording means recording said signals such that digital information signals correspond to X segments are recorded in one of said X segments, X being an integer equal to or greater than two, each of the M tracks having a number of regions equal to a product of N and two, said recording means recording the signals outputted from said recording signal processing means such that an even sample group and an odd sample group for each channel are recorded in each track of said one of said X segments and groups containing consecutive samples of the same channel are recorded in different regions of adjacent tracks, the different regions being formed at different positions in a longitudinal direction of the track.

19. The apparatus as claimed in claim 18, wherein said recording means records samples inputted in one field period in the area in the same segment.

20. The apparatus as claimed in claim 18, wherein samples inputted in two field periods are considered a unit and said recording means records even samples and odd samples in the regions of different segments.

21. The apparatus as claimed in claim 18, wherein the area of the magnetic tape is provided in a region preceding an area in which video signals of each field are recorded.

22. The apparatus as claimed in claim 18, further comprising:

playback signal processing means for playing back the signals formed of samples recorded on the magnetic tape, for correcting errors, for rearranging the samples, taking the samples inputted during a predetermined time period as a unit, into an original sampling order, and for outputting the rearranged samples.

23. The apparatus as claimed in claim 18, wherein said coding means performs coding which is completed in one track.

24. An apparatus having a plurality of sets of M heads, M being an integer equal to or greater than two, mounted in proximity to each other, for recording video signals and digital information signals of N channels, N being an integer equal to or greater than two, to form tracks inclined with respect to a direction corresponding to a length of a magnetic tape, for each scanning by each set of M heads one segment consisting of M tracks is recorded, digital information signals corresponding to X segments being recorded in one of said X segments, X being an integer equal to or greater than two, the digital information signals being divided into even and odd samples, the even and odd samples each being divided into M/2 sample groups such that consecutive even samples and consecutive odd samples are assigned to different sample groups, sample groups containing one of consecutive odd samples and consecutive even samples of a same channel being located in non-adjacent tracks, and for playing back, from a magnetic tape each of M tracks in the area, digital information signals for N channels inputted for a predetermined time at recording and having been time-axis compressed, comprising:

playback signal processing means for receiving the digital information signals formed of samples played back from the heads, for rearranging, for each channel, the samples of the M tracks, and for outputting the rearranged samples;

decoding means for detecting or correcting errors contained in the samples; and compensation means for compensating the sample not corrected by said decoding means by using a mean value of adjacent samples;

said playback signal processing means forming digital information signals for each channel from signals played back from a number of regions equal to a product of N and two for each track;

said playback signal processing means rearranging the samples, as a unit, into a sampling order which is the same as before recording.

25. The apparatus as claimed in claim 24, wherein said playback signal processing means considers the digital signals recorded in X segments as a unit.

26. The apparatus as claimed in claim 24, wherein said playback signal processing means considers the digital signals recorded in two regions of a plurality of segments as a unit.

27. The apparatus as claimed in claim 24, wherein the area of the magnetic tape is provided in an area preceding an area in which video signals of each field are recorded.

28. An apparatus for recording digital information signals from two or more channels on a recording medium to form m tracks, the information signals being inputted for a predetermined time, the information being distributed along the tracks, each track having a number of regions equal to the number of channels, comprising:

recording signal processing means for interleaving the digital information signals and for outputting the interleaved digital information signals; and recording means for recording the signals supplied from said recording signal processing means on the recording medium to form the tracks;

said recording signal processing means dividing the digital information signals into odd samples and even samples for each channel, dividing the odd samples for each channel into m/2 sample groups and dividing the even samples for each channel into m/2 sample groups, one of consecutive odd and consecutive even samples of a same channel being assigned to different sample groups;

said recording signal processing means interleaving the sample groups such that the sample groups recorded in the regions of each track are from different channels and sample groups containing consecutive samples of a same channel are located in adjacent regions of different tracks, the different regions being formed at different positions in a longitudinal direction of the tracks.

29. A method for recording digital information signals of n channels, n being an integer equal to or greater than two on a recording medium, the digital information signals being distributed across m tracks, each track having n regions, comprising the steps of:

(a) dividing the digital information signals for each of the n channels for a predetermined time into m groups so that the digital information signals are recorded in a number of regions equal to a product of n and m;

(b) dividing even samples and odd samples of the digital information signals for each channel into m/2 number of sample groups, respectively, the sample groups of different channels being allocated to the n regions in each track, one of consecutive odd samples and consecutive even samples being assigned to different sample groups; and (c) recording sample groups containing consecutive samples for a same channel in adjacent tracks at different regions, the different regions being formed at different positions in a longitudinal direction of the tracks.

* * * * *